US012791787B2

(12) United States Patent
Bian

(10) Patent No.: US 12,791,787 B2

(45) Date of Patent: Nov. 10, 2026

(54) PHOTONIC INTEGRATED CIRCUIT STRUCTURE WITH POLARIZATION DEVICE FOR HIGH POWER APPLICATIONS

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 145 days.

(21) Appl. No.: 18/619,985

(22) Filed: Mar. 28, 2024

(65) Prior Publication Data

US 2024/0241313 A1 Jul. 18, 2024

Related U.S. Application Data

(62) Division of application No. 17/808,168, filed on Jun. 22, 2022, now abandoned.

(51) Int. Cl.

*G02B 6/122* (2006.01)
*G02B 6/12* (2006.01)
*G02B 6/126* (2006.01)

(52) U.S. Cl.

CPC ........... *G02B 6/1228* (2013.01); *G02B 6/126* (2013.01); *G02B 6/12002* (2013.01); *G02B 2006/12061* (2013.01); *G02B 2006/1215* (2013.01)

(58) Field of Classification Search

CPC .............................. G02B 6/126; G02B 6/1228
See application file for complete search history.

(56) References Cited

U.S. PATENT DOCUMENTS 9,122,006 B1 9/2015 Roth et al.
9,366,818 B1 6/2016 Lin et al.
(Continued)

FOREIGN PATENT DOCUMENTS

JP 2018028566 A 2/2018

OTHER PUBLICATIONS

Aboketaf et al., "Towards fully automated testing and characterization for photonic compact modeling on 300-mm wafer platform," 2021 Optical Fiber Communications Conference and Exhibition (OFC), IEEE 2021, 3 pages.

(Continued)

*Primary Examiner* — Thomas A Hollweg
*Assistant Examiner* — Kirsten D. Endresen
(74) *Attorney, Agent, or Firm* — Francois Pagette; Hoffman Warnick LLC

(57) ABSTRACT

Disclosed is a structure including a polarization device with first and second waveguides. The first waveguide includes a core (e.g., a silicon nitride (SiN) core) suitable for high-power applications. The second waveguide includes: a primary core (e.g., another SiN core), which is positioned laterally adjacent to the core of the first waveguide and suitable for high-power applications, and secondary core(s) stacked vertically with the primary core to steer the optical mode and ensure that mode matching occurs between adjacent first and second coupling sections of the first and second waveguides, respectively, in order to achieve high-power splitter and/or combiner functions. Optionally, the primary and secondary cores of the second waveguide can be tapered at least within the second coupling section to increase the likelihood of mode matching.

18 Claims, 20 Drawing Sheets

(56) References Cited

U.S. PATENT DOCUMENTS

| | | | | |
|---|---|---|---|---|
| 9,588,289 | B1 | 3/2017 | Astier et al. | |
| 9,645,312 | B2 | 5/2017 | Barwicz et al. | |
| 10,036,851 | B1 | 7/2018 | Peng et al. | |
| 10,429,581 | B1 | 10/2019 | Thomas et al. | |
| 10,641,956 | B1 | 5/2020 | Bian et al. | |
| 10,795,083 | B1 | 10/2020 | Bian et al. | |
| 10,816,728 | B1 | 10/2020 | Bian et al. | |
| 10,942,314 | B2 * | 3/2021 | Horth | G02B 6/12002 |
| 10,996,398 | B1 | 5/2021 | Bian et al. | |
| 11,125,944 | B2 | 9/2021 | Bian et al. | |
| 11,181,693 | B1 | 11/2021 | Bian | |
| 12,019,286 | B2 * | 6/2024 | Horth | G02B 6/12004 |
| 2005/0254128 | A1 * | 11/2005 | Watts | G02B 6/126 359/558 |
| 2006/0120657 | A1 | 6/2006 | Little | |
| 2014/0287964 | A1 | 9/2014 | Lundquist et al. | |
| 2016/0131837 | A1 * | 5/2016 | Mahgerefteh | G02B 6/124 385/14 |
| 2017/0023735 | A1 | 1/2017 | Barwicz et al. | |
| 2018/0314005 | A1 * | 11/2018 | Lin | G02B 6/126 |
| 2022/0120966 | A1 | 4/2022 | Liu et al. | |
| 2023/0146759 | A1 | 5/2023 | Tambasco | |

OTHER PUBLICATIONS

Bian et al., "3D Integrated Laser Attach Technology on 300-mm Monolithic Silicon Photonics Platform," IEEE 2020, 2 pages.

Bian et al., "Hybrid III-V laser integration on a Monolithic Silicon Photonic Platform," Optical Fiber Communication Conference (OFC) 2021, OSA Technical Digest (Optical Publishing Group 2021), paper M5A.2.

Bian et al., "Integrated Laser Attach Technology on a Monolithic Silicon Photonics Platform," IEE 71st Electronic Components and Technology Conference (ECTC), 2020, pp. 237-244.

Bian et al., Monolithically Integrated Silicon Nitride Platform, OSA 2021, pp. 1-3.

Bian et al., "Towards Low-Loss Monolithic Silicon and Nitride Photonic Building Blocks in State-of-the-Art 300mm CMOS Foundry," Frontiers in Optics/Laser Science, OSA 2020, pp. 1-2.

Ding et al., "Wideband polarization splitter and rotator with large fabrication tolerance and simple fabrication process," Optics Letters, vol. 38, No. 8, Apr. 15, 2013, pp. 1227-1229.

European Search Report for corresponding EP Application No. 22206329.9 dated May 25, 2023, 9 pages.

Giewont et al., "300-mm Monolithic Silicon Photonics Foundry Technology," IEEE Journal of Selected Topics in Quantum Electronics, vol. 25, No. 5, 2019, pp. 1-12.

Huang et al., "Broadband integrated optic polarization splitters by incorporating polarization mode extracting waveguide," www.nature.com/scientificreports, Published online Jul. 6, 2017, pp. 1-7.

Liu et al., "Polarization beam splitter based on silicon nitride-silica-silcon horizontal slot waveguide," Optical Letters, vol. 44, Issue 6, 2019, pp. 1335-1338.

Peng et al., "A CMOS Compatible Monolithic Fiber Attach Solution with Reliable Performance and Self-alignment," OSA 2020, 3 pages.

Rakowski et al., "45nm CMOS-Silicon Photonics Monolithic Technology (45CLO) for Next-Generation, Low Power and High Speed Optical Interconnects," OSA 2020, pp. 1-3.

Sacher et al., "Monolithically Integrated Multilayer Silicon Nitride-On-Silicon Waveguide Platforms for 3-D Photonic Circuits and Devices," Proceedings of the IEEE, vol. 106, No. 12, 2018, pp. 2232-2245.

Sacher et al., "Polarization rotator-splitters in standard active silicon photonics platforms," Optics Express, vol. 22, No. 4, OSA, Feb. 10, 2014, 10 pages.

Socci et al., "300 nm bandwidth adiabatic SOI polarization splitter-rotators exploiting continuous symmetry breaking," OSA 2015, 11 pages.

Su et al., "Four-port integrated polarizing beam splitter," Optics Letters, vol. 39, No. 4, Feb. 15, 2014, pp. 965-968.

Sun et al., "Realization of an ultra-compact polarization beam splitter using asymmetric MMI based on silicon nitride/ silicon-on-insulator platform," Optics Express, vol. 25, No. 7, Apr. 3, 2017, pp. 8296-8305.

Troia et al., "Design and Optimization of Polarization Splitting and Rotating Devices in Silicon-on-Insulator Technology," Hindawi Publishing Corp., Advances in OptoElectronics, vol. 2014, Article 490405, Published Feb. 6, 2014, 11 pages.

Wang et al., "Broadband and compact polarization beam splitter based on an asymmetrical directional coupler with extra optimizing designs," 2019 Applied Optics, vol. 58, No. 30, pp. 8221-8226.

Zhou et al., "High energy irradiation effects on silicon photonic passive devices," Optics Express, vol. 30, No. 3, Jan. 31, 2022, 11 pages.

European Communication for corresponding EP Application No. 22206329.9-1001 dated Dec. 8, 2025, 7 pages.

* cited by examiner

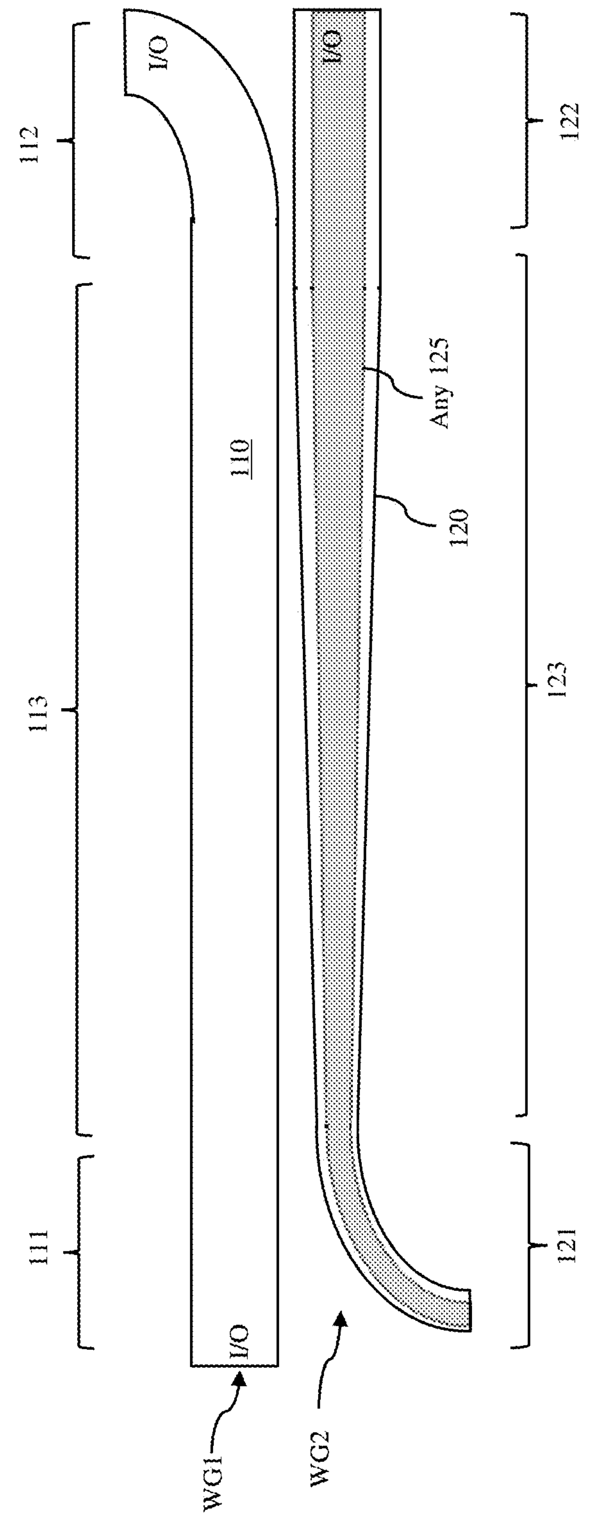
FIG. 9.1

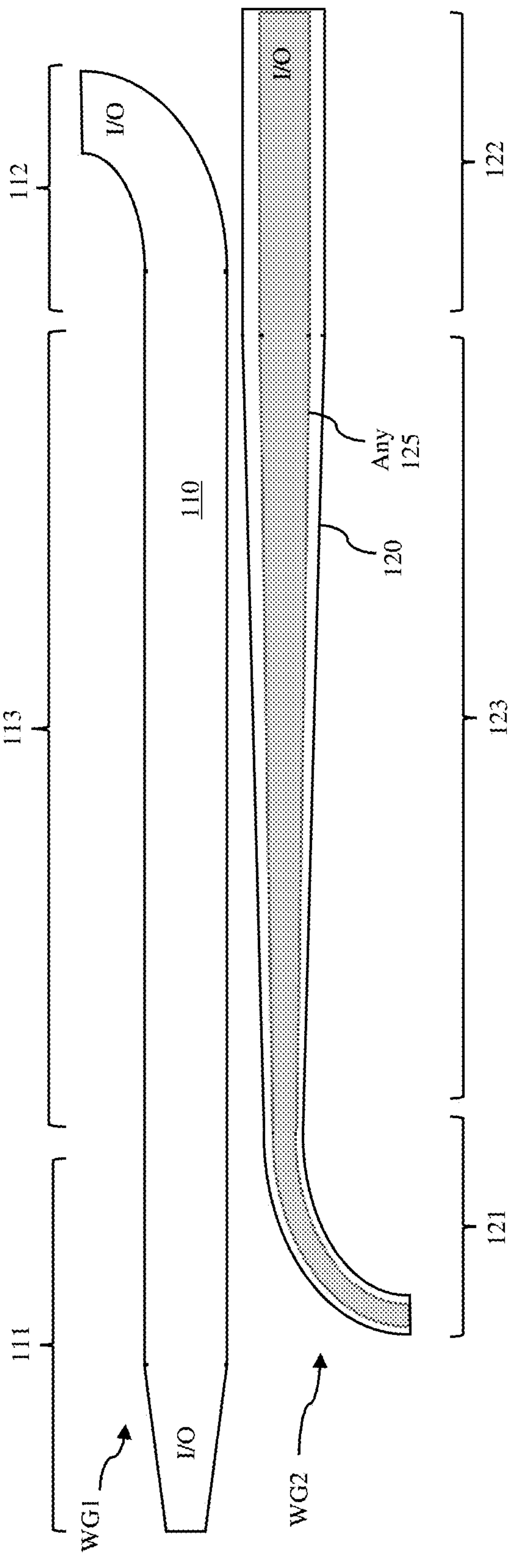
FIG. 9.2

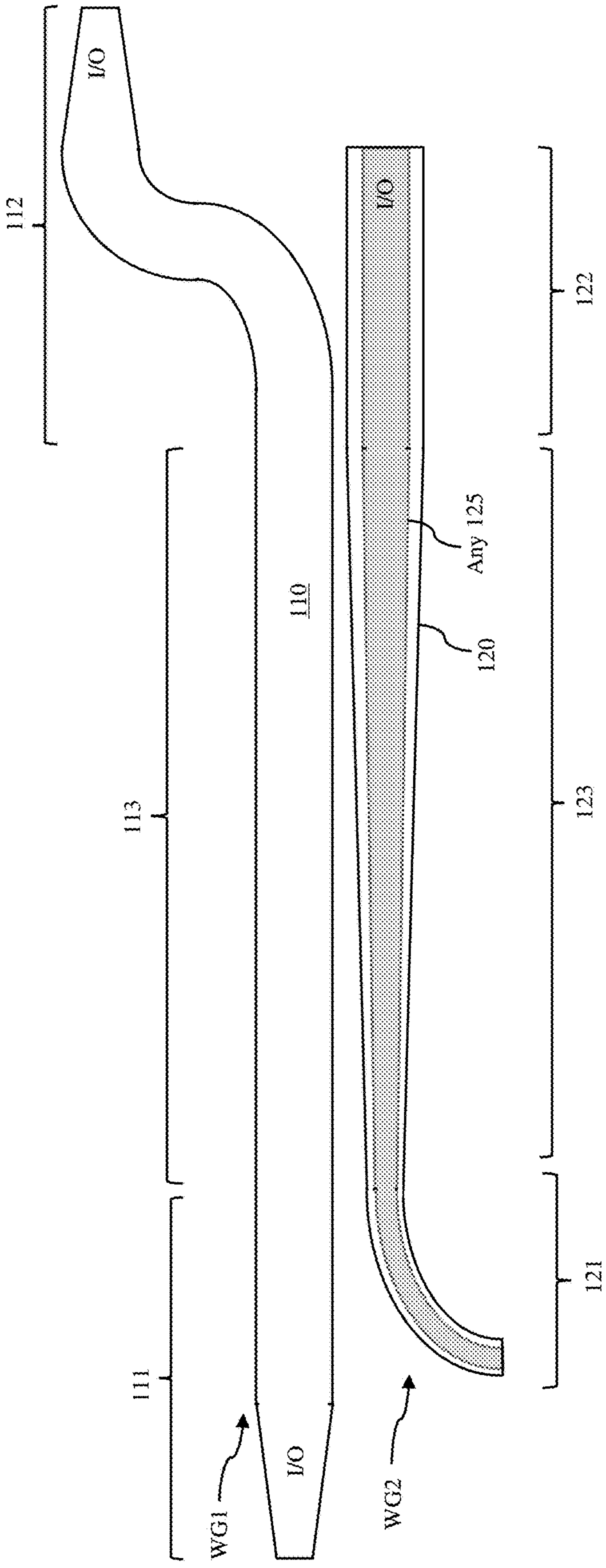
FIG. 9.3

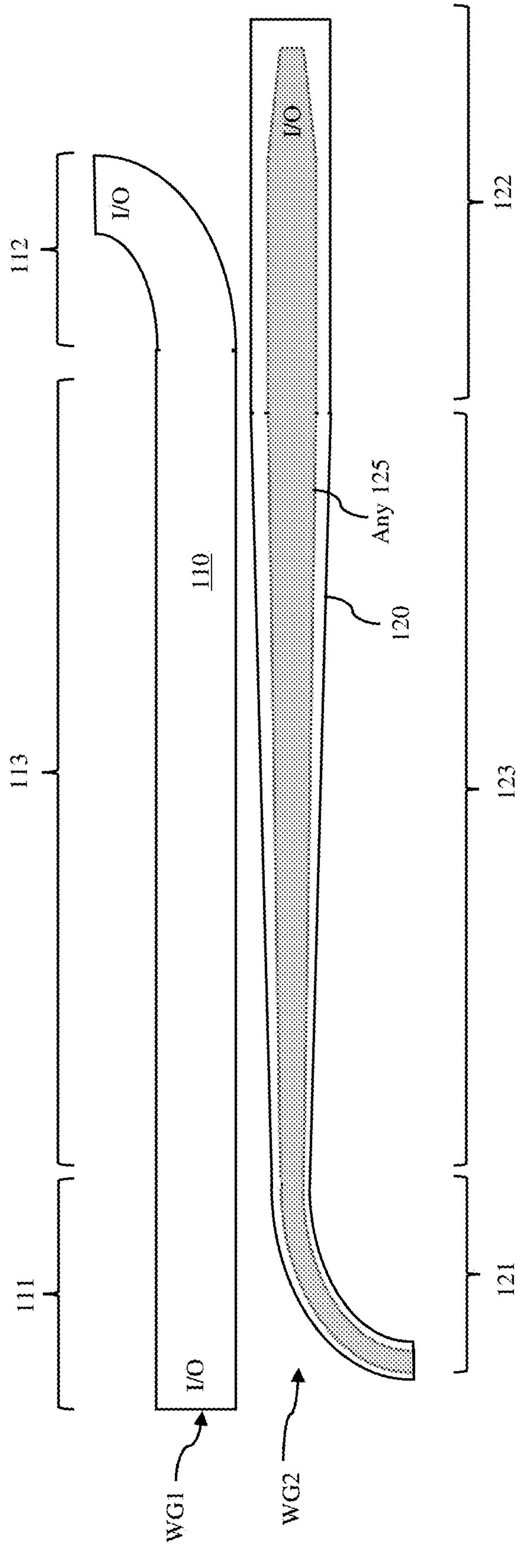
FIG. 9.4

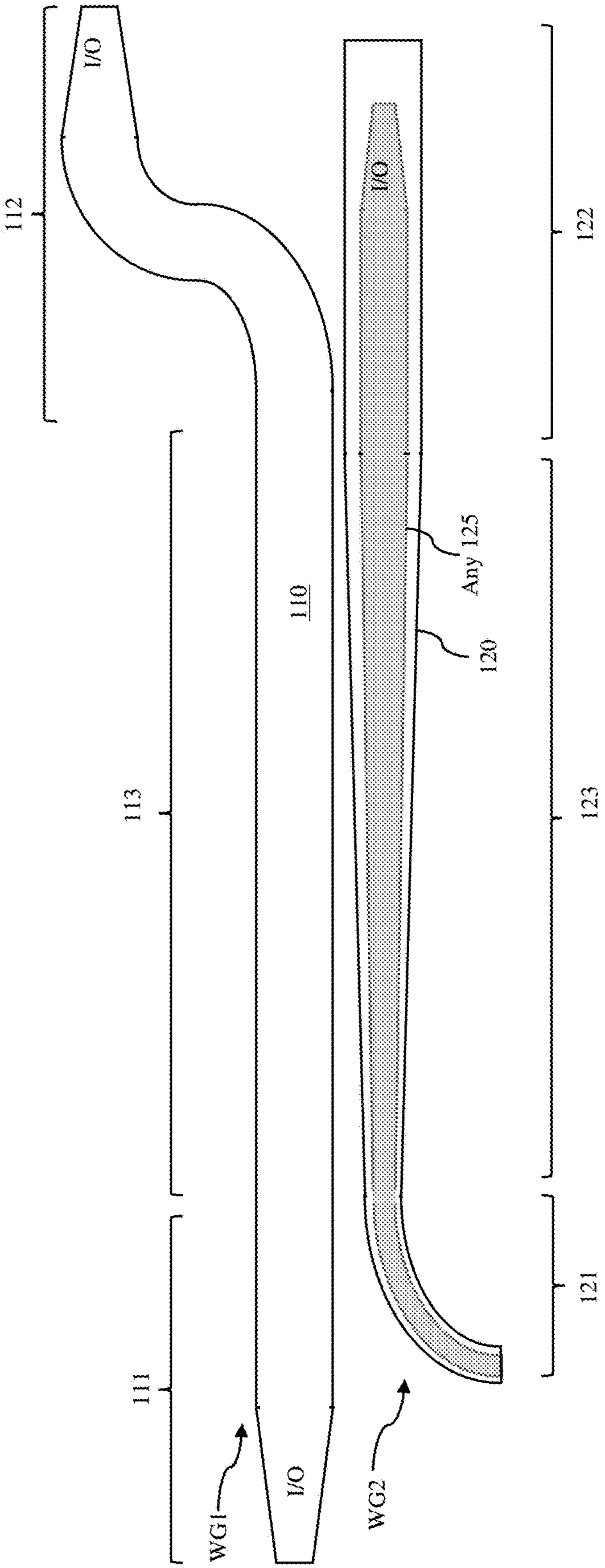
FIG. 9.5

PHOTONIC INTEGRATED CIRCUIT STRUCTURE WITH POLARIZATION DEVICE FOR HIGH POWER APPLICATIONS

BACKGROUND

Field of the Invention

The present invention relates to photonic integrated circuit (PIC) structures and, more particularly, to embodiments of a PIC structure including a polarization device (e.g., a polarization splitter or a polarization combiner).

Description of Related Art

Photonic integrated circuit (PIC) structures often include polarization devices, such as polarization splitters or polarization combiners. Such polarization devices typically include a pair of waveguides with silicon (Si) cores. The main advantages associated with using Si cores in polarization devices are that they are compatible with complementary metal oxide semiconductor (CMOS) processing and that they can have a relatively small footprint. The main disadvantages associated with using Si cores in polarization devices are that they tend to exhibit significant power-dependent loss and they are not easily integrated with high-power photonic devices, such as high-power waveguides with silicon nitride (SiN) cores, because such integration requires the inclusion Si-to-SiN input and output transitions that tend to exhibit signal loss and increase area consumption.

SUMMARY

In view of the foregoing, disclosed herein are embodiments of a PIC structure including a robust high-power polarization device (e.g., a high-power polarization splitter or a high-power polarization combiner). The polarization device can include a first waveguide and a second waveguide. The first waveguide can include a core (e.g., a SiN core) suitable for high-power applications. The second waveguide can be a stacked waveguide and can include: a primary core (e.g., another SiN core), which is positioned laterally adjacent to the core of the first waveguide and similarly suitable for high-power applications; and at least one secondary core, which is stacked vertically with the primary core (e.g., above and/or below) to steer the optical mode and ensure mode matching (e.g., TM-mode matching) occurs between adjacent first and second coupling sections of the first and second waveguides, respectively, in order to achieve high-power splitter and/or combiner functions. Optionally, the primary and secondary cores of the second waveguide can be tapered to increase the probability that mode matching will occur. Also, optionally, one or more input/output (I/O) ports of the core of the first waveguide and/or of the secondary core(s) of the second waveguide can be tapered to improve performance. Formation of such a polarization device is easily integrated with formation of other high-power photonic devices (e.g., SiN photonic devices).

Disclosed herein are embodiments of a structure including a first waveguide and a second waveguide. The first waveguide can have first end sections and a first coupling section between the first end sections. The first waveguide can include a first core. The second waveguide can have second end sections and a second coupling section, which is between the second end sections and which is further adjacent to the first coupling section. The second waveguide can be a stacked waveguide with multiple cores stacked vertically. Specifically, the second waveguide can include a second core (also referred to herein as a primary core), which is positioned laterally adjacent to the first core such that the first core and the second core are in the same horizonal plane (i.e., at the same level). The second waveguide can further include an additional second core (also referred to herein as a secondary core), which is stacked vertically with the second core (e.g., above or below).

In some embodiments of the structure, the second waveguide can include three or more cores stacked vertically. That is, some embodiments of the structure disclosed herein can include a first waveguide and a second waveguide. The first waveguide can have first end sections and a first coupling section between the first end sections. The first waveguide can include a first core. The second waveguide can have second end sections and a second coupling section, which is between the second end sections and which is further adjacent to the first coupling section. The second waveguide can be a stacked waveguide with multiple cores stacked vertically. Specifically, the second waveguide can include a second core (i.e., a primary core), which is positioned laterally adjacent to the first core such that the first core and the second core are in the same horizonal plane (i.e., at the same level). The second waveguide can further include multiple additional second cores (i.e., multiple secondary cores), which are stacked vertically with the second core (e.g., above and/or below).

In some embodiments of the structure, the cores of the second waveguide can be tapered at least within the second coupling section (e.g., to facilitate mode matching between the first and second coupling sections) and one or more input/output (I/O) ports of the first core within the first waveguide and/or of the additional second core(s) within the second waveguide can also be tapered for improved performance. That is, some embodiments of the structure disclosed herein can include a first waveguide and a second waveguide. The first waveguide can have first end sections and a first coupling section between the first end sections. The first waveguide can include a first core. The second waveguide can have second end sections and a second coupling section, which is between the second end sections and which is further adjacent to the first coupling section. The second waveguide can be a stacked waveguide with multiple cores stacked vertically. Specifically, the second waveguide can include a second core (also referred to herein as a primary core), which is positioned laterally adjacent to the first core such that the first core and the second core are in the same horizonal plane (i.e., at the same level). The second waveguide can further include an additional second core (also referred to herein as a secondary core), which is stacked vertically with the second core (e.g., above or below). Additionally, in these embodiments, the second core and the additional second core can be tapered at least within the second coupling section. Furthermore, at least one I/O port of the first core and/or the additional second core is also tapered.

BRIEF DESCRIPTION OF THE SEVERAL VIEWS OF THE DRAWINGS

The present invention will be better understood from the following detailed description with reference to the drawings, which are not necessarily drawn to scale and in which:

FIGS. 9.1-9.5 are different layout diagrams illustrating tapering of one or both of the I/O ports of the first core and/or any of the additional second core(s) in the first and second end sections of the first and second waveguides, respectively, in polarization device in any of the disclosed PIC structure embodiments.

DETAILED DESCRIPTION

Figure 1A:
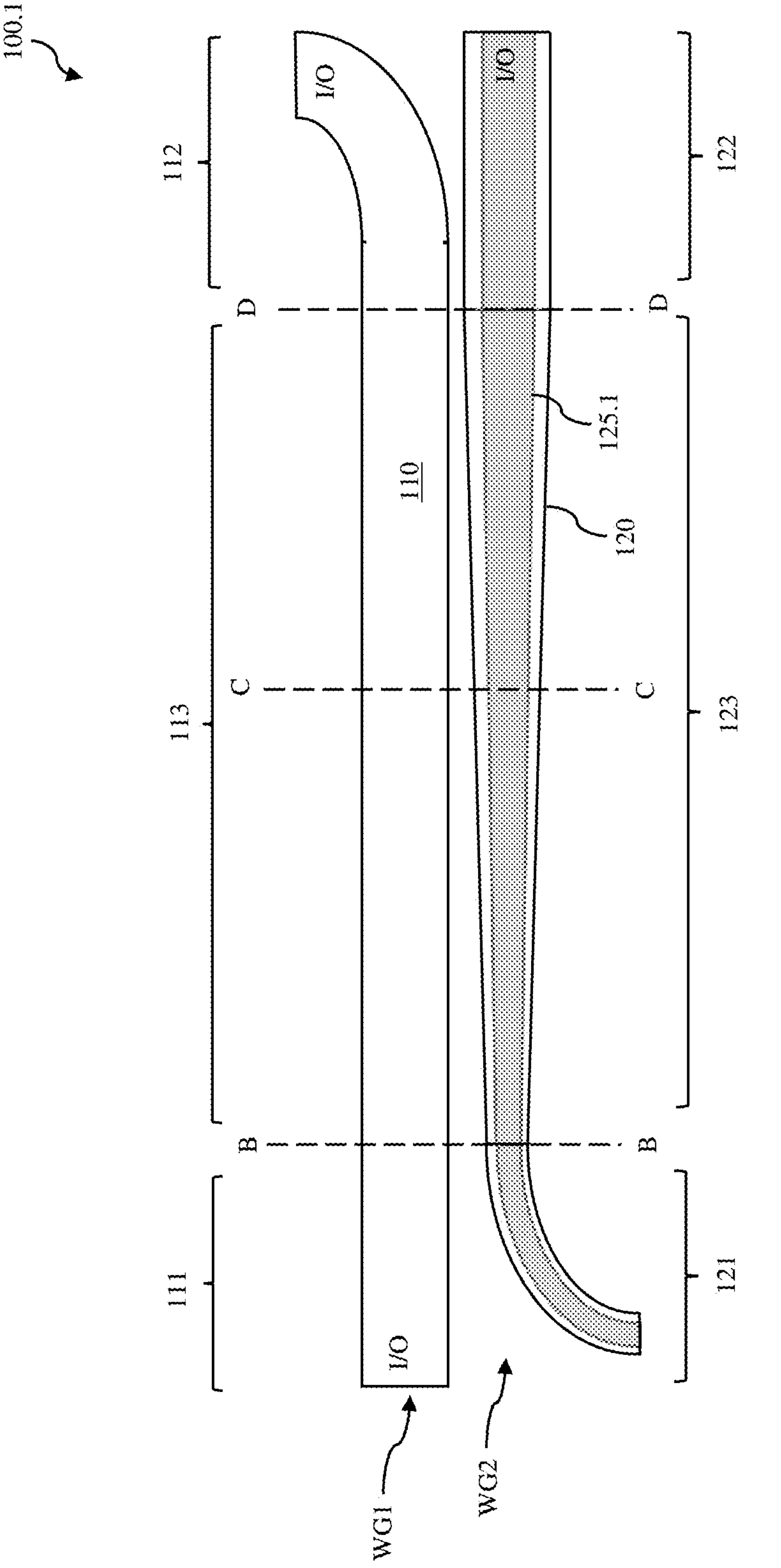
FIG. 1A is a layout diagram and FIGS. 1B-1D are different cross-section diagrams illustrating an embodiment of a PIC structure including a polarization device 100.1.

As mentioned above, photonic integrated circuit (PIC) structures often include polarization devices, such as polarization splitters or polarization combiners.

A polarization splitter includes a first waveguide and a second waveguide. The first waveguide has first end sections and a first coupling section, which extends between the first end sections. The second waveguide has second end sections and a second coupling section, which extends between the second end sections and is adjacent to the first coupling section. Both electric (TE)-mode light signals and transverse magnetic (TM)-mode light signals are received at a first input of a first end section and propagate toward a first output of the opposite first end section. However, prior to the light signals reaching the opposite first end section, some form of mode matching (e.g., TM-mode matching) occurs between the first coupling section and the second coupling section such that matched mode light signals pass from the first waveguide into the second waveguide and propagate toward a second output at a second end section of the second waveguide. Thus, light signals of one mode (e.g., TE-mode light signals) are output from the first output of the first waveguide and light signals of the other mode (e.g., TM-mode light signals) are output from the second output of the second waveguide.

A polarization combiner has essentially the same first and second waveguide configuration. However, in this case, light signals of one mode (e.g., TE-mode light signals) are received at a first input of a first end section of the first waveguide and propagate toward a first output of the opposite first end section. Light signals of the opposite mode (e.g., TM-mode light signals) are received at a second input of a second end section of the second waveguide and propagate toward a second output at the opposite second end section. However, prior to these light signals reaching the respective opposite end sections, some form of mode matching (e.g., TM-mode matching) occurs between the first coupling section and the second coupling section such that matched mode light signals pass from the second waveguide into the first waveguide and propagate toward the first output. Thus, light signals of both modes (i.e., TE-mode light signals and TM-mode light signals) are output from the first output of the first waveguide.

Typically, the first and second waveguides in a polarization device (i.e., in a polarization splitter or a polarization combiner) have silicon (Si) cores patterned from the same silicon layer within the PIC structure (e.g., the silicon layer of a silicon-on-insulator (SOI) substrate) such that these Si cores are essentially co-planar. The main advantages associated with using Si cores in polarization devices are that they are compatible with complementary metal oxide semiconductor (CMOS) processing and that they can have a relatively small footprint. The main disadvantages associated with using Si cores in polarization devices are that they tend to exhibit significant power-dependent loss and they are not easily integrated with high-power photonic devices, such as high-power waveguides with silicon nitride (SiN) cores, because such integration requires the inclusion Si-to-SiN input and output transitions that tend to exhibit signal loss and increase area consumption. Thus, there is a need in the art for polarization devices (e.g., polarization splitters and polarization combiners) that are easily integrated with high-power photonic device processing and that are more robust and exhibit improved performance in high-power applications.

In view of the foregoing, disclosed herein are embodiments of a PIC structure including a robust high-power polarization device (e.g., a high-power polarization splitter or a high-power polarization combiner). The polarization device can include a first waveguide and a second waveguide. The first waveguide can include a core (e.g., a SiN core) suitable for high-power applications. The second waveguide can be a stacked waveguide and can include: a primary core (e.g., another SiN core), which is positioned laterally adjacent to the core of the first waveguide and similarly suitable for high-power applications; and at least one secondary core, which is stacked vertically with the primary core (e.g., above and/or below) to steer the optical mode and ensure mode matching (e.g., TM-mode matching) occurs between adjacent first and second coupling sections of the first and second waveguides, respectively, in order to achieve high-power splitter and/or combiner functions. Optionally, the primary and secondary cores of the second waveguide can be tapered to increase the probability that mode matching will occur. Also, optionally, one or more I/O ports of the core of the first waveguide and/or of the secondary core(s) of the second waveguide can be tapered to improve performance. Formation of such a polarization device is easily integrated with formation of other high-power photonic devices (e.g., SiN photonic devices).

Figure 1D:
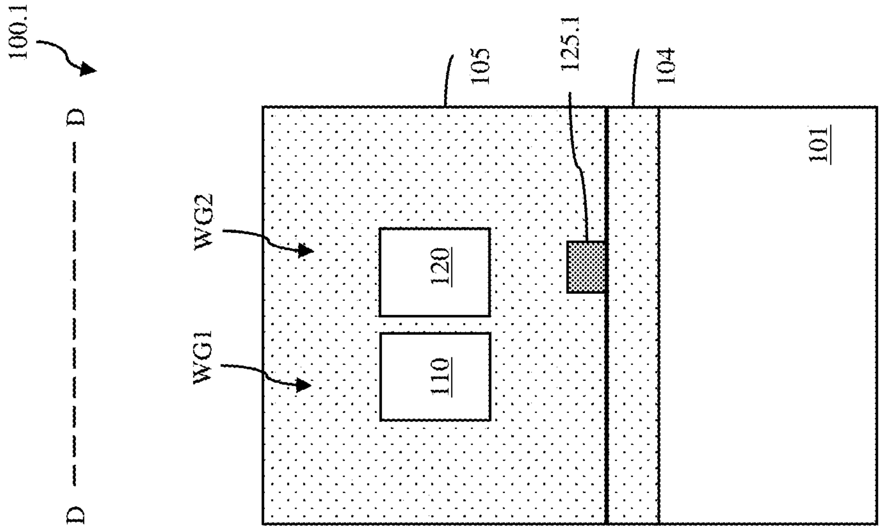
Figure 1C:
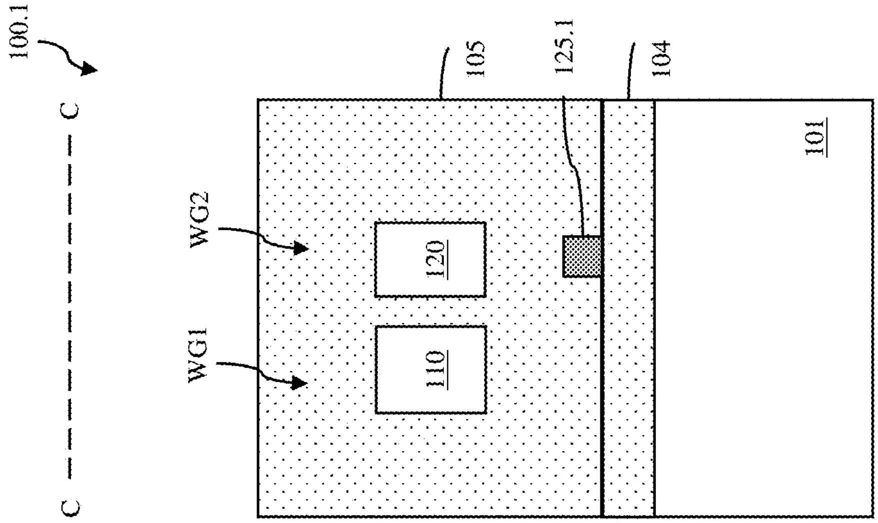
Figure 1B:
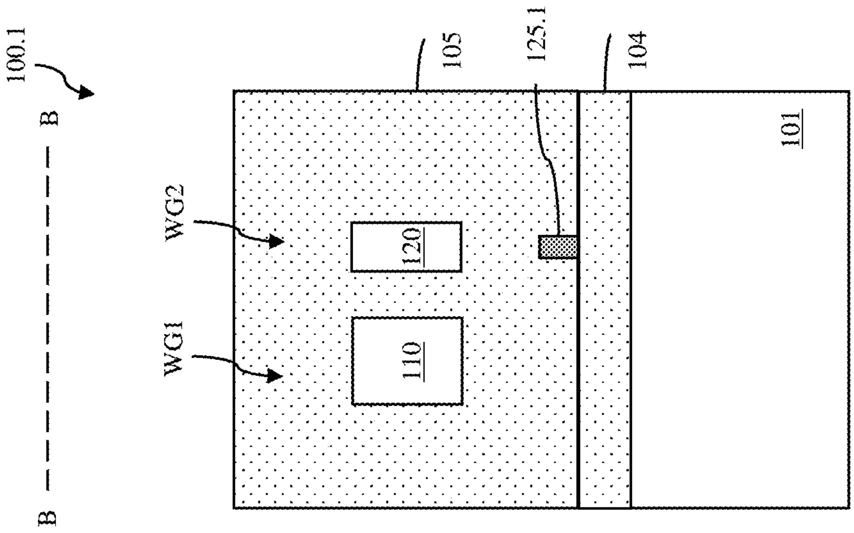
Figure 2A:
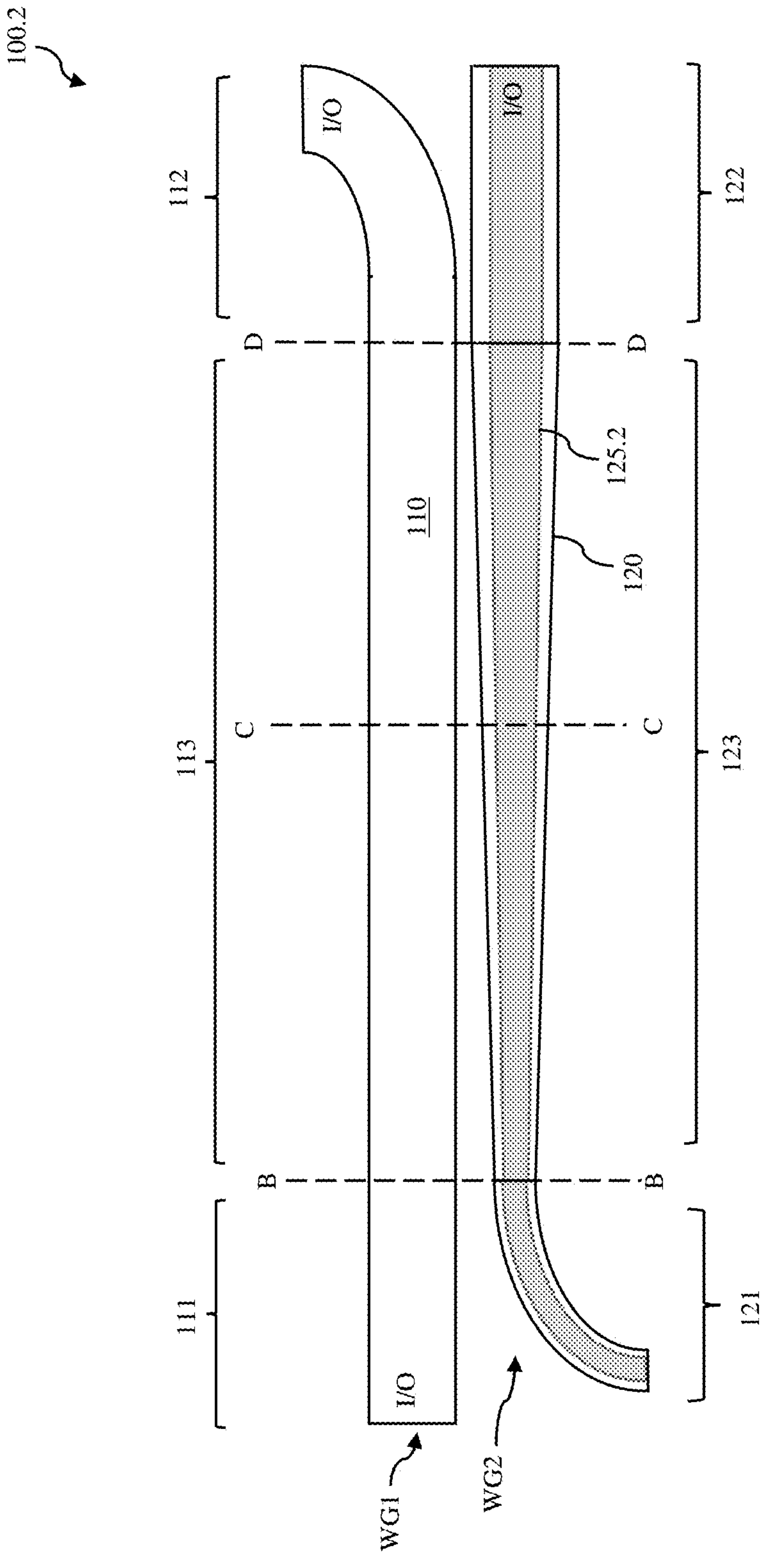
FIG. 2A is a layout diagram and FIGS. 2B-2D are different cross-section diagrams illustrating another embodiment of a PIC structure including a polarization device 100.2.
Figure 2B:
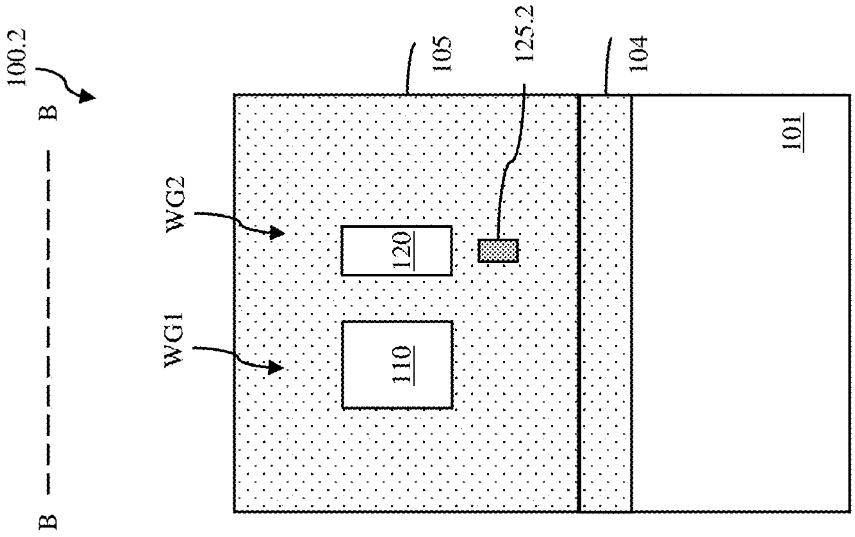
Figure 2C:
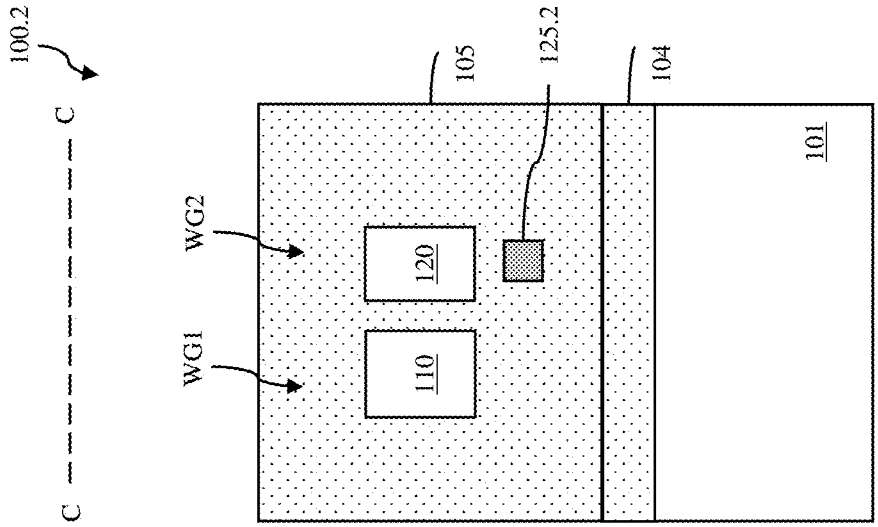
Figure 2D:
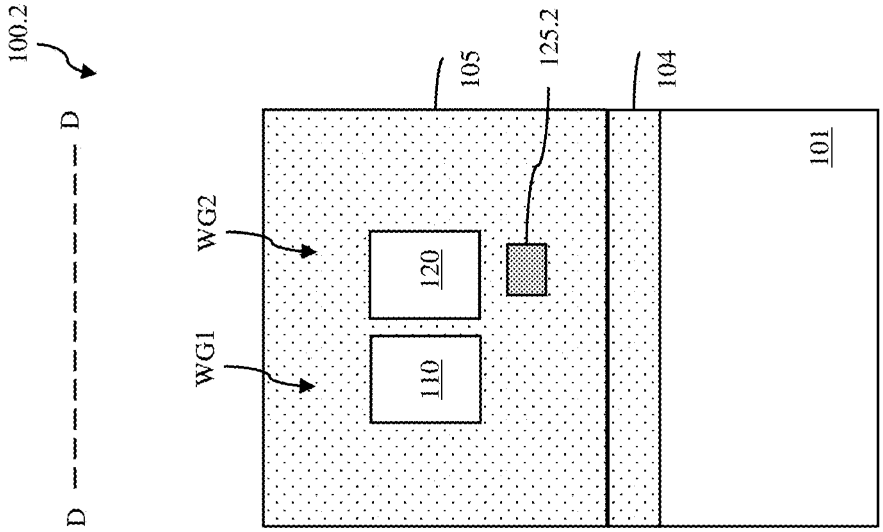
Figure 3A:
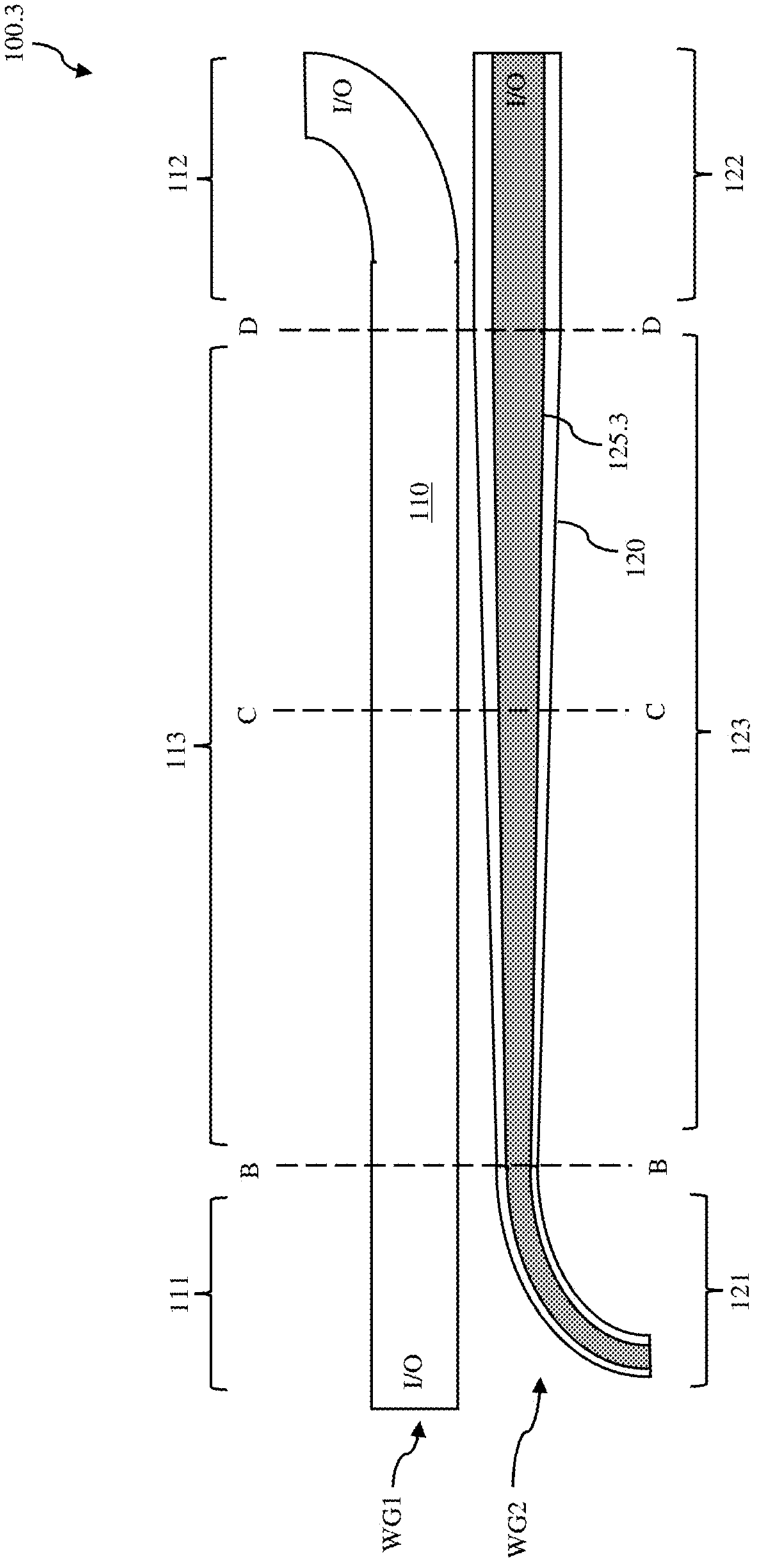
FIG. 3A is a layout diagram and FIGS. 3B-3D are different cross-section diagrams illustrating yet another embodiment of a PIC structure including a polarization device 100.3.
Figure 3B:
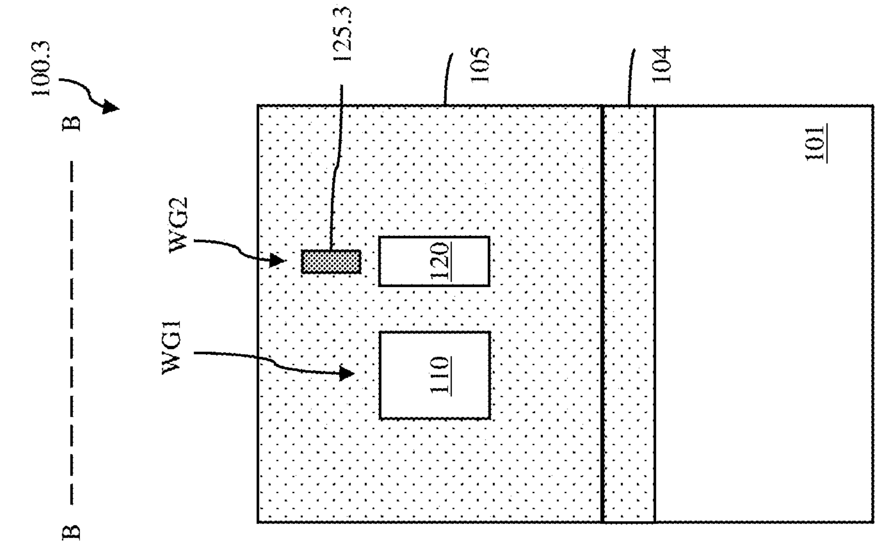
Figure 3C:
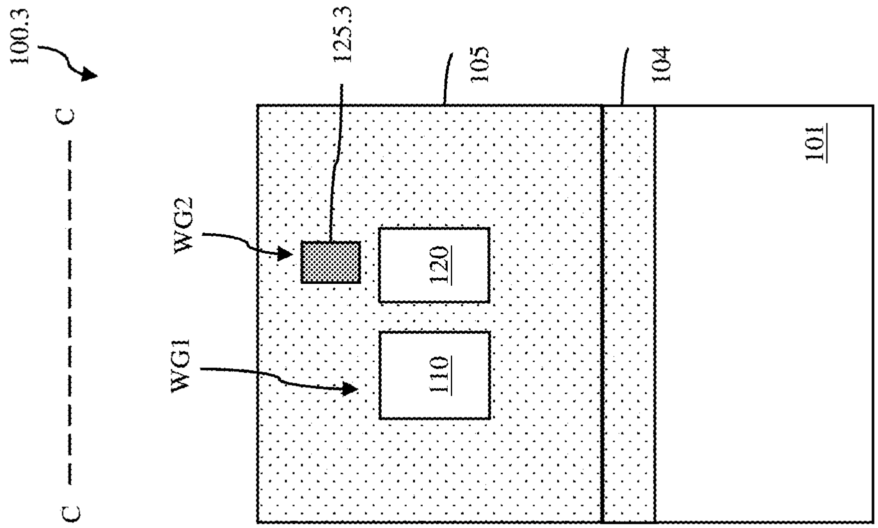
Figure 3D:
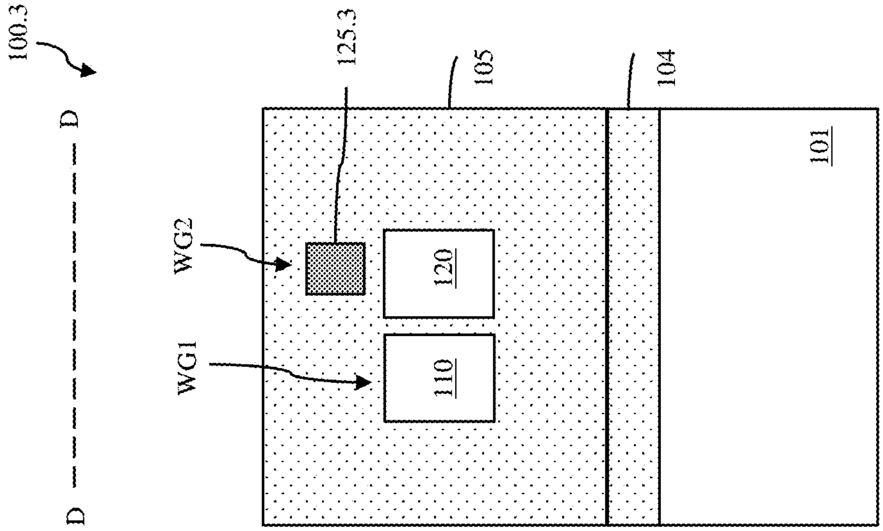
Figure 4A:
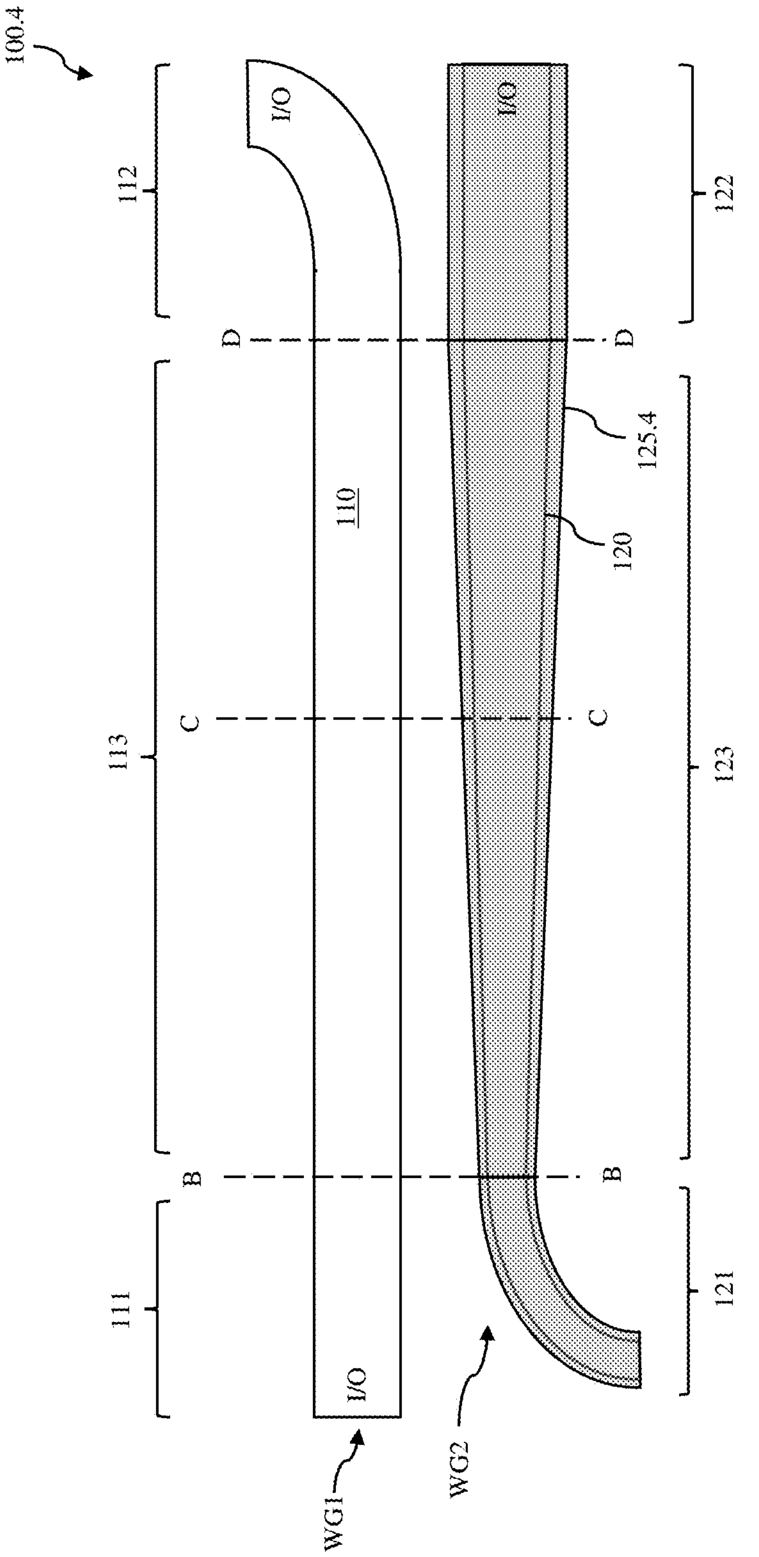
FIG. 4A is a layout diagram and FIGS. 4B-4D are different cross-section diagrams illustrating yet another embodiment of a PIC structure including a polarization device 100.4.
Figure 4D:
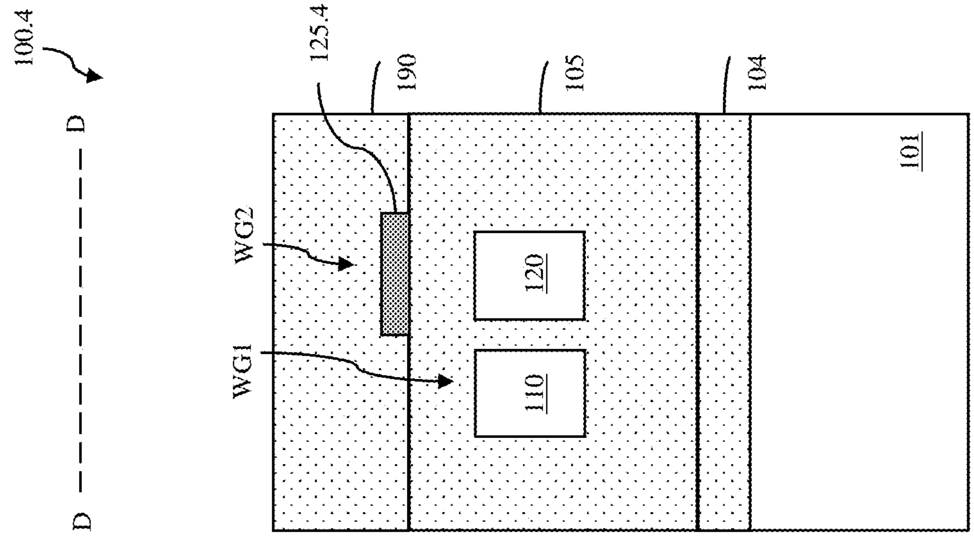
Figure 4C:
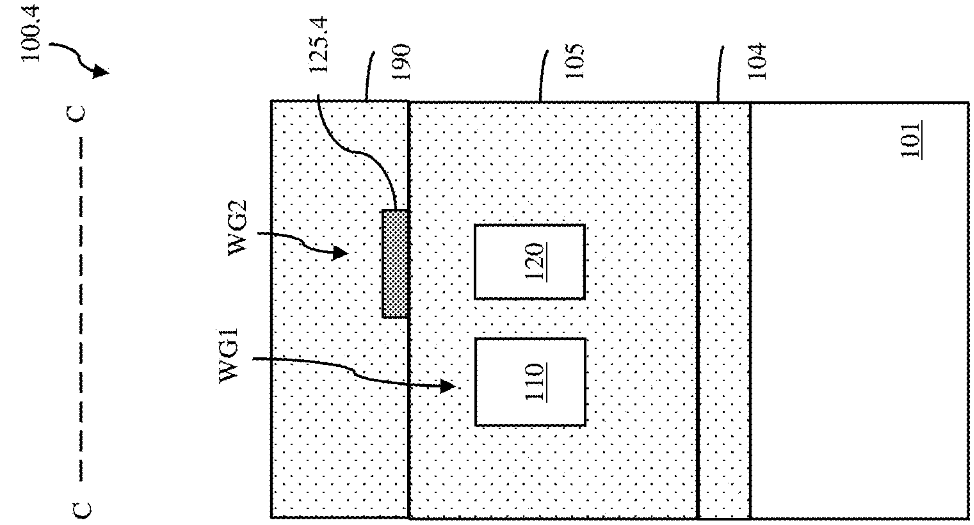
Figure 4B:
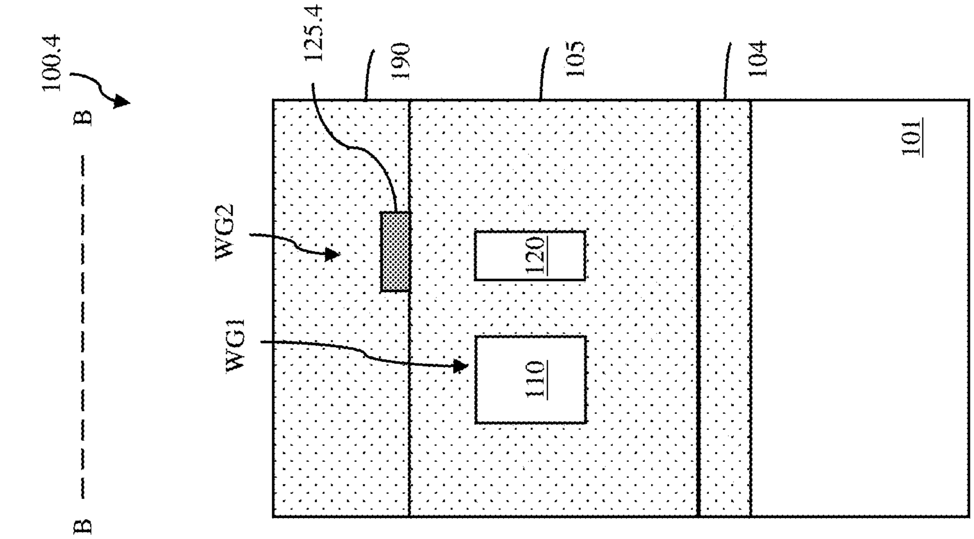
Figure 5A:
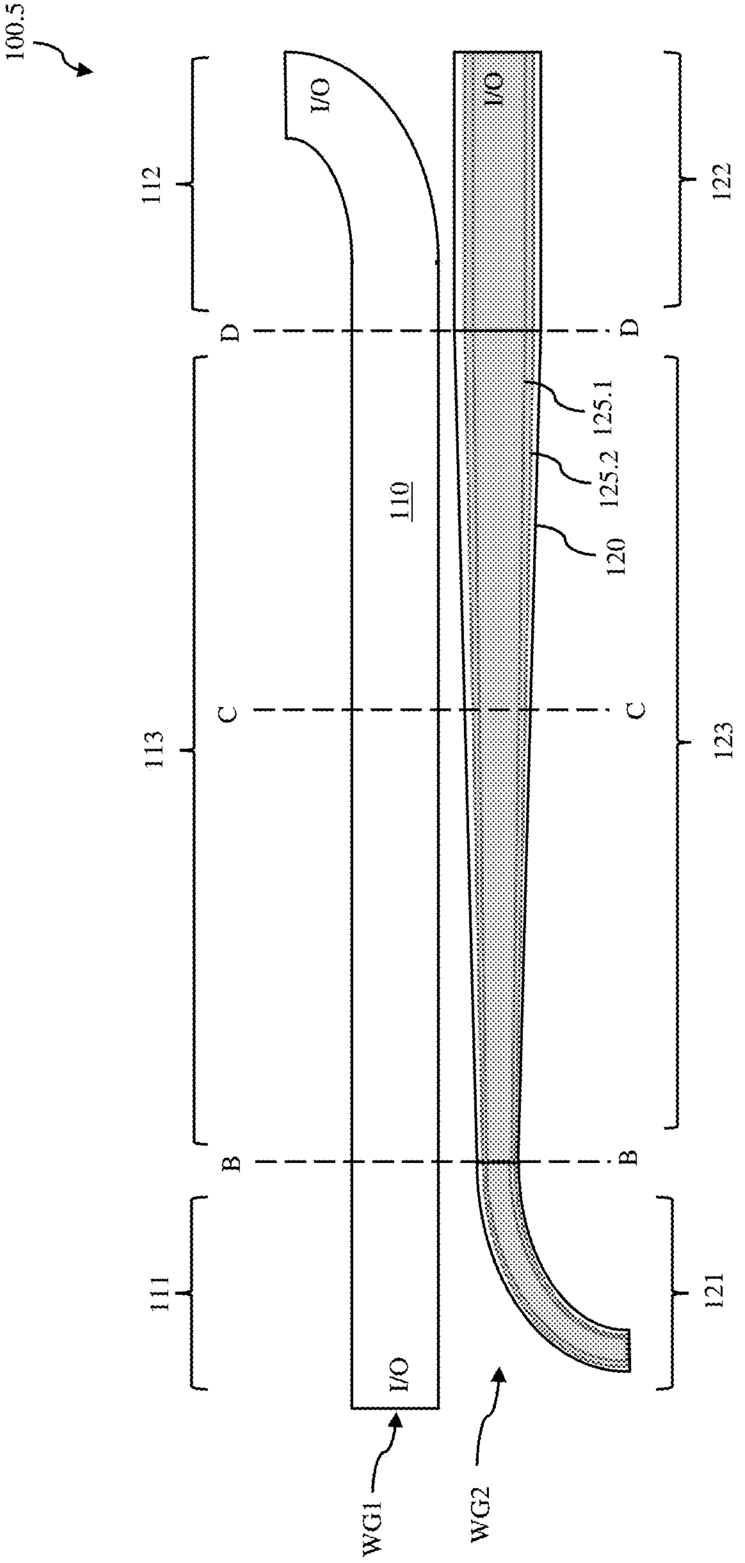
FIG. 5A is a layout diagram and FIGS. 5B-5D are different cross-section diagrams illustrating yet another embodiment of a PIC structure including a polarization device 100.5.
Figure 5D:
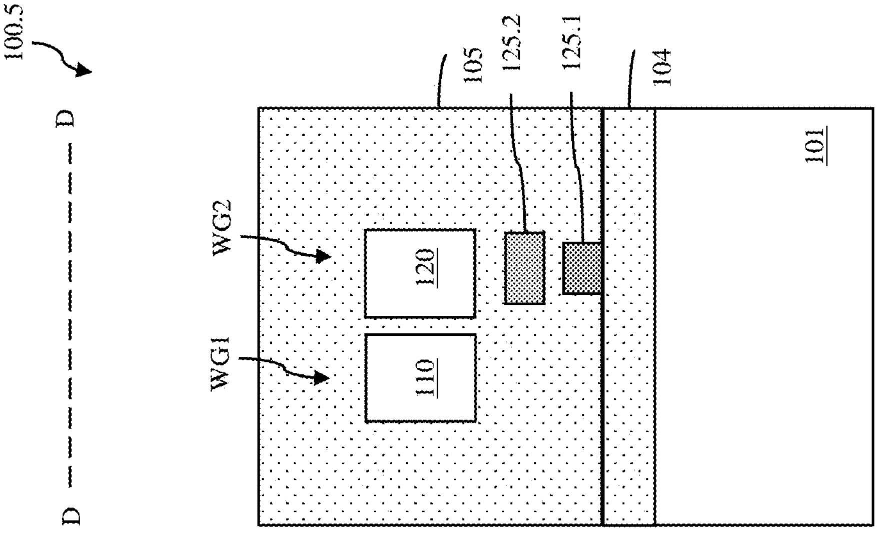
Figure 5C:
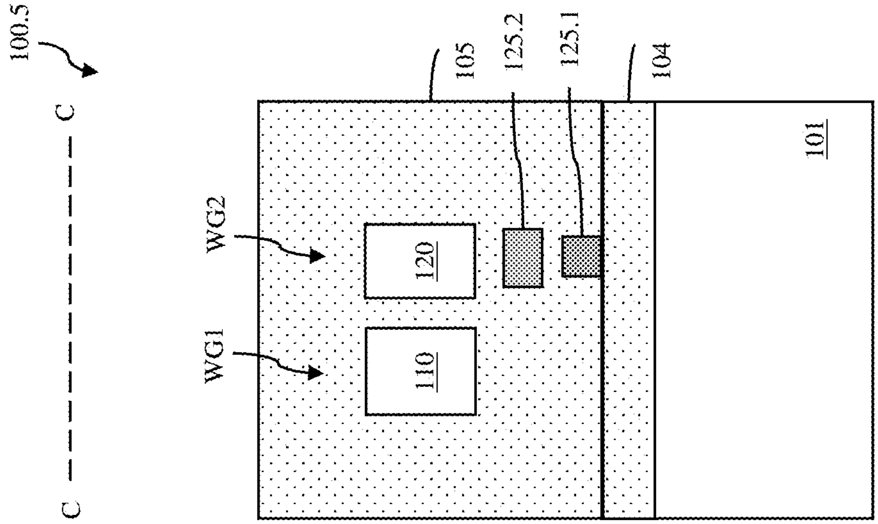
Figure 5B:
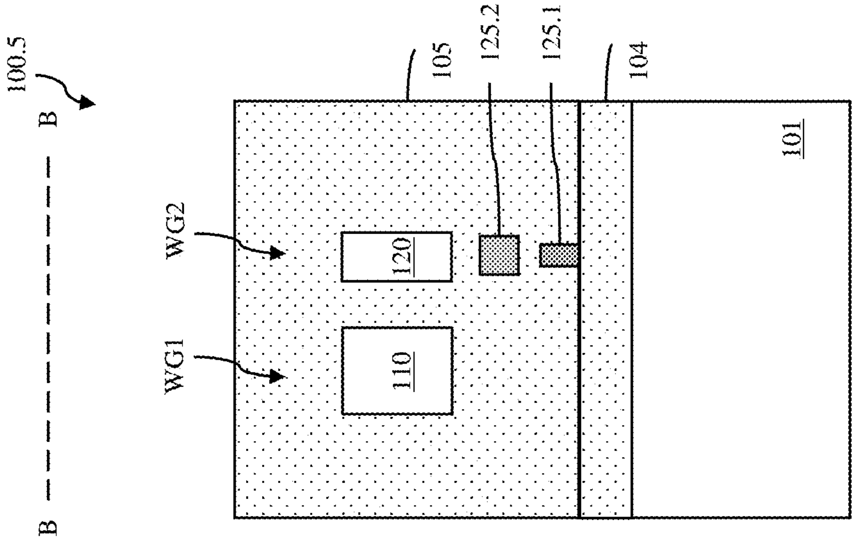
Figure 6A:
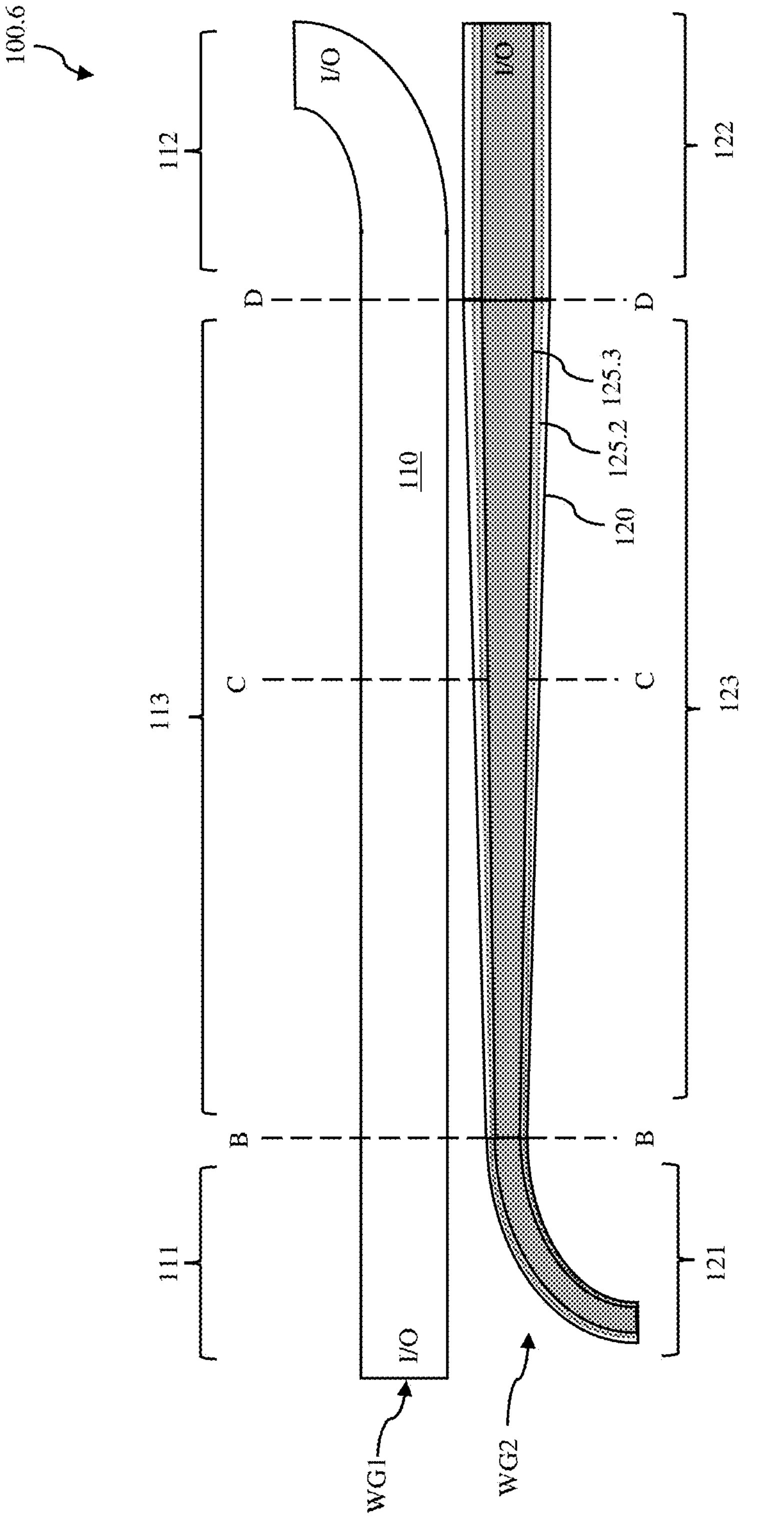
FIG. 6A is a layout diagram and FIGS. 6B-6D are different cross-section diagrams illustrating yet another embodiment of a PIC structure including a polarization device 100.6.
Figure 6D:
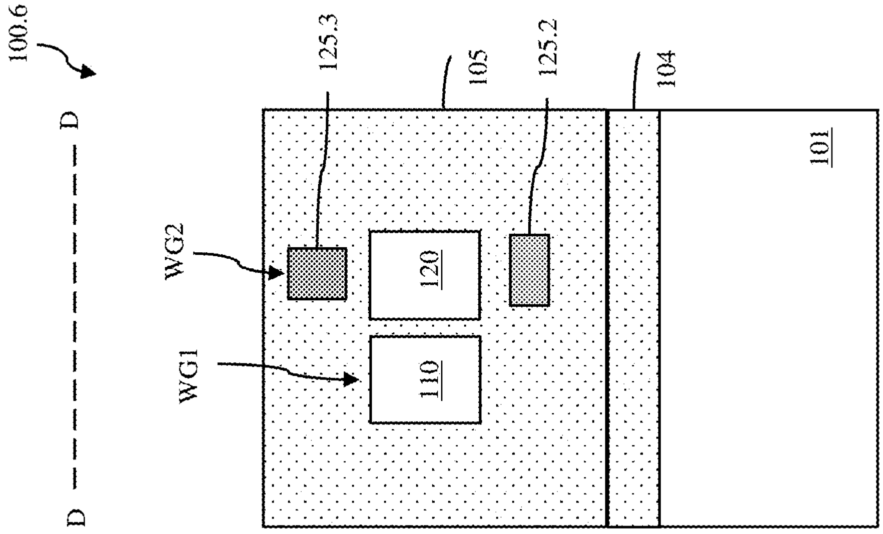
Figure 6C:
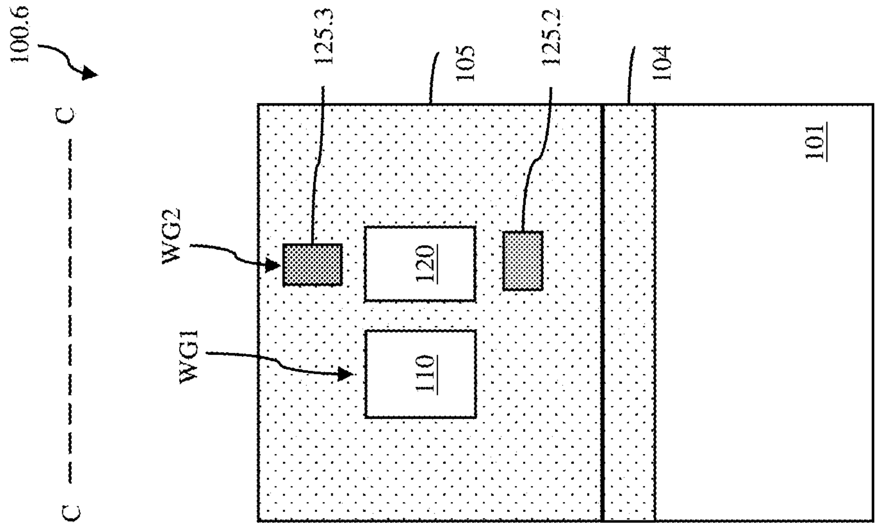
Figure 6B:
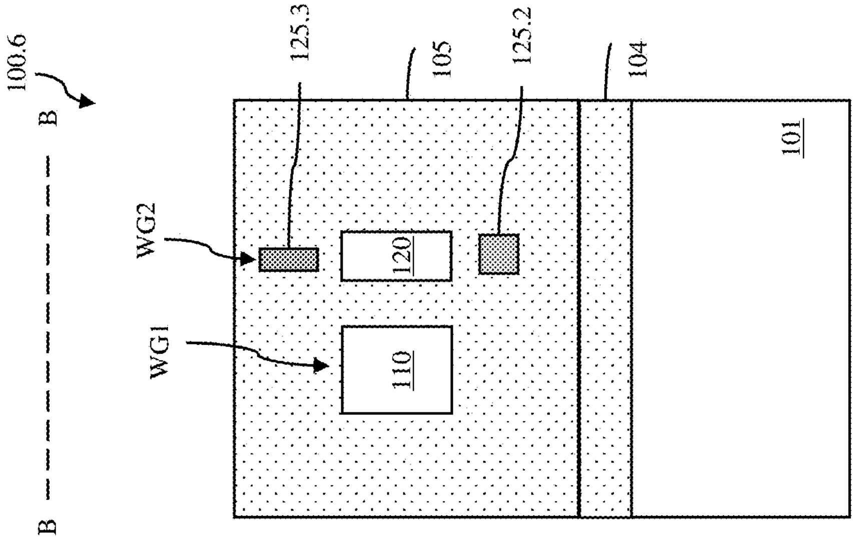
Figure 7A:
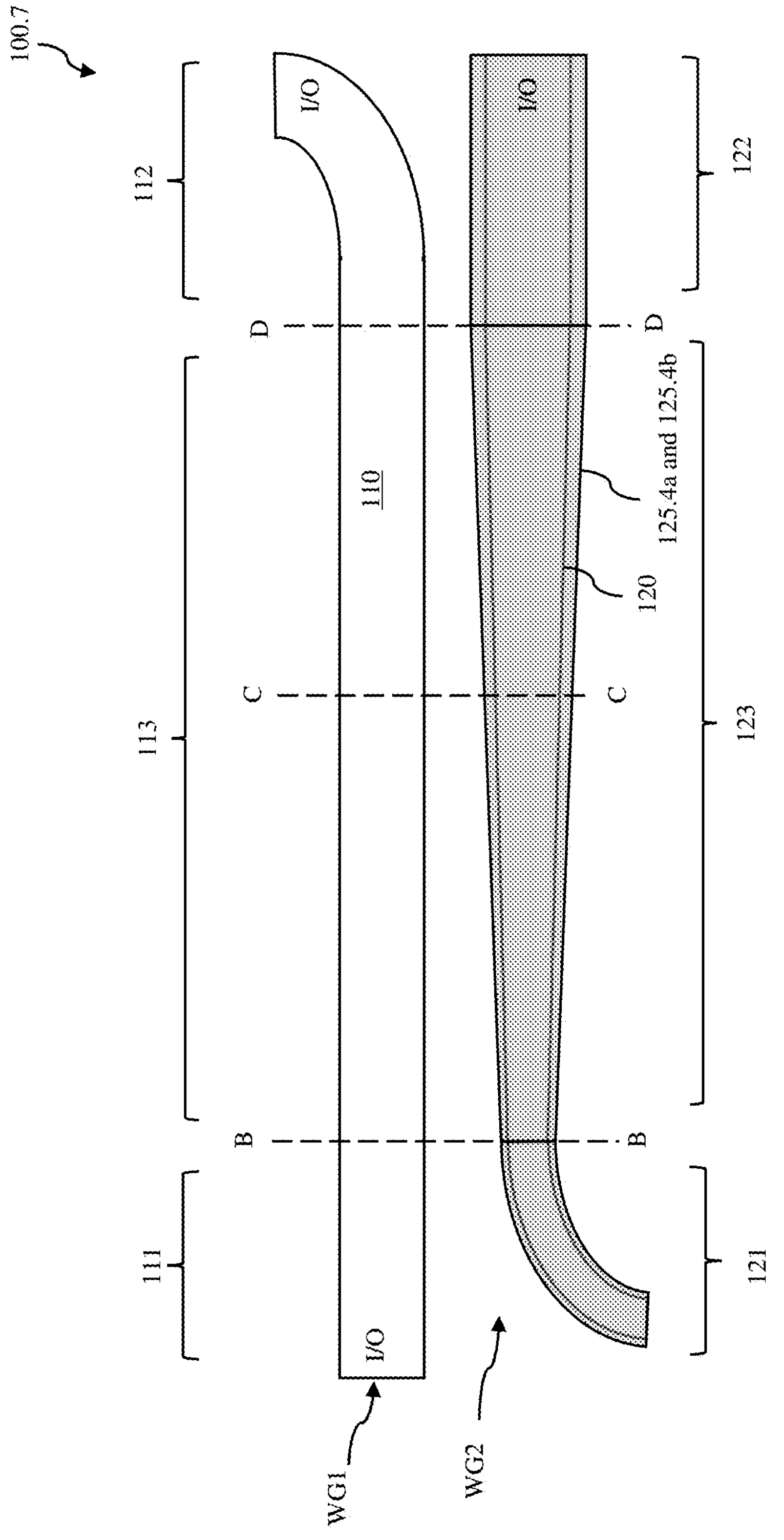
FIG. 7A is a layout diagram and FIGS. 7B-7D are different cross-section diagrams illustrating yet another embodiment of a PIC structure including a polarization device 100.7.
Figure 7D:
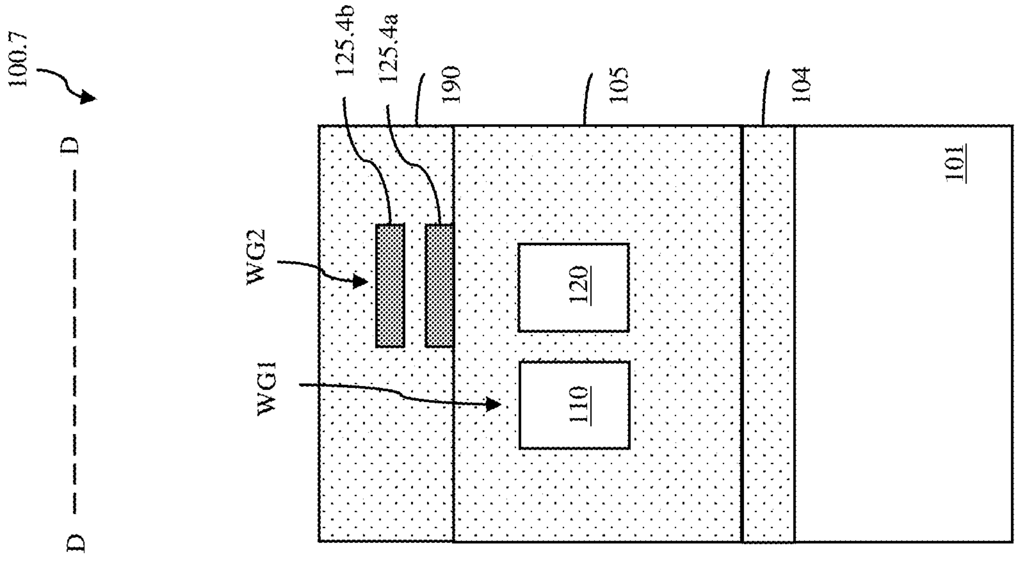
Figure 7C:
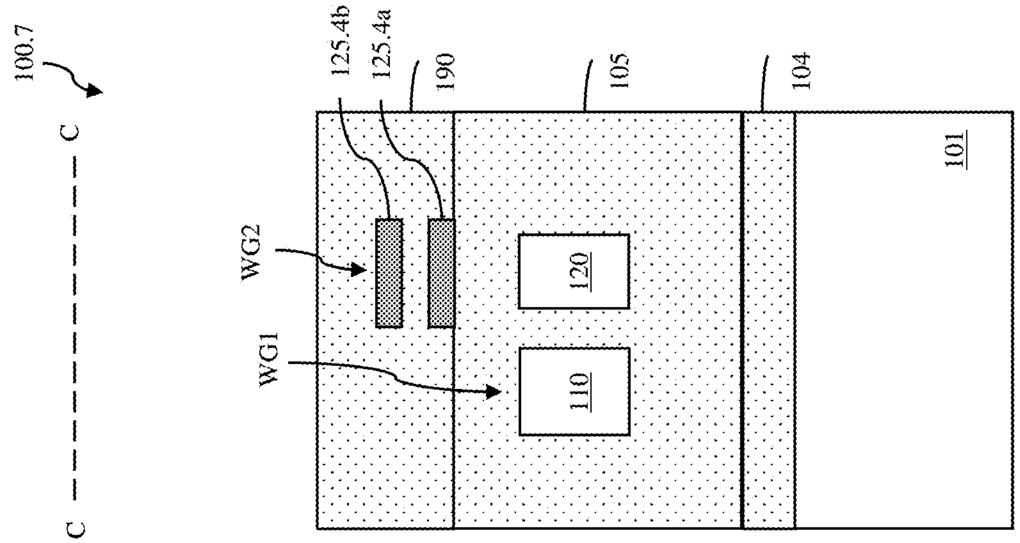
Figure 7B:
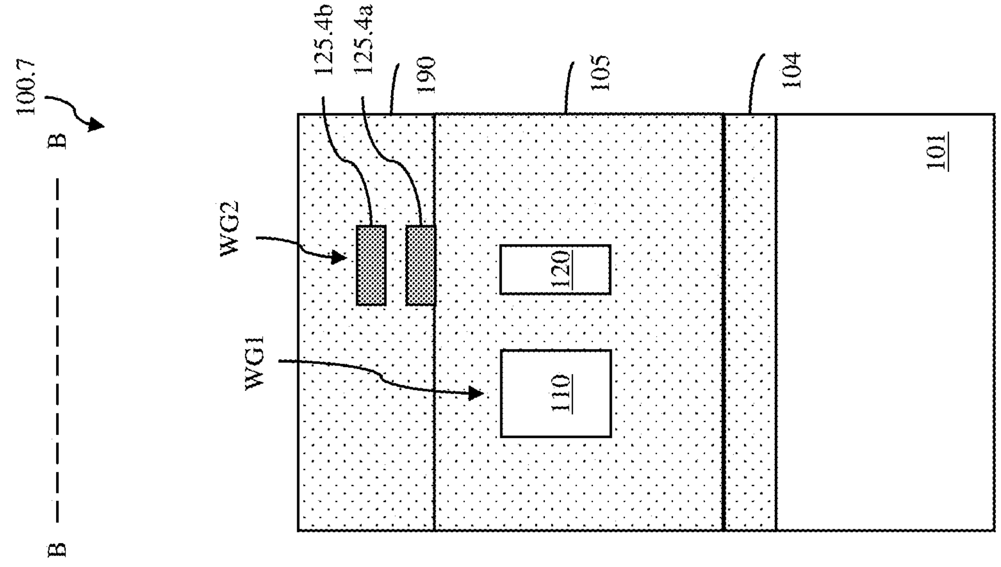

FIG. 1A is a layout diagram and FIGS. 1B-1D are different cross-section diagrams illustrating an embodiment of a PIC structure including a polarization device 100.1. FIG. 2A is a layout diagram and FIGS. 2B-2D are different cross-section diagrams illustrating another embodiment of a PIC structure including a polarization device 100.2. FIG. 3A is a layout diagram and FIGS. 3B-3D are different cross-section diagrams illustrating yet another embodiment of a PIC structure including a polarization device 100.3. FIG. 4A is a layout diagram and FIGS. 4B-4D are different cross-section diagrams illustrating yet another embodiment of a PIC structure including a polarization device 100.4. FIG. 5A is a layout diagram and FIGS. 5B-5D are different cross-section diagrams illustrating yet another embodiment of a PIC structure including a polarization device 100.5. FIG. 6A is a layout diagram and FIGS. 6B-6D are different cross-section diagrams illustrating yet another embodiment of a PIC structure including a polarization device 100.6. FIG. 7A is a layout diagram and FIGS. 7B-7D are different cross-section diagrams illustrating yet another embodiment of a PIC structure including a polarization device 100.7.

In each of these embodiments, the PIC structure can include a substrate 101. The substrate 101 can be, for example, a semiconductor substrate, such as a silicon substrate. The substrate can have a first surface (e.g., a bottom surface) and a second surface (e.g., a top surface) opposite the first surface. Optionally, the PIC structure can further include an insulator layer 104 on the second surface of the substrate 101. The insulator layer 104 can be, for example, a silicon dioxide layer (also referred to herein as a buried oxide (BOX) layer) or a layer of some other suitable insulator material.

As mentioned above, in each of these embodiments, the PIC structure can further include a polarization device (see polarization device 100.1 of FIGS. 1A-1D, 100.2 of FIGS. 2A-2D, 100.3 of FIGS. 3A-3D, 100.4 of FIGS. 4A-4D, 100.5 of FIGS. 5A-5D, 100.6 of FIGS. 6A-6D and 100.7 of FIGS. 7A-7D). The polarization devices 100.1-100.7 can each be either a splitter or a combiner, as discussed in greater detail below. However, in any case, the polarization devices 100.1-100.7 can each include a first waveguide (WG1) and a second waveguide (WG2) above the second surface of the substrate (e.g., above the insulator layer 104).

WG1 can have first end sections 111-112 and a first coupling section 113 extending laterally between the first end sections 111-112. Each first end section can have a corresponding I/O port distal to the first coupling section 113. WG1 can include a first core 110 and suitable cladding material (as discussed in greater detail below) surrounding the first core 110.

The first core 110 can have a strip/wire geometry, as illustrated. That is, first core 110 can be an elongated body and a vertical cross-sectional shape of this elongated body cutting across its width can be essentially rectangular with a planar bottom surface, a planar top surface opposite the planar bottom surface, and opposing sidewalls. Alternatively, the first core 110 could have some other suitable geometry (e.g., a rib geometry (not shown), etc.). The height of the elongated body of the first core 110 can be essentially uniform from one end to the other (as illustrated). The width of the elongated body of the first core 110 can also be essentially uniform (as illustrated). Alternatively, the width of the elongated body of the first core 110 could be tapered (e.g., within the first coupling section of WG) (not shown). Optionally, one or both of the I/O ports can also be tapered (as discussed in greater detail below with regard to FIGS. 9.1-9.5). Within the first coupling section 113, the first core can be essentially linear. Within one or both of the first end sections 111-112, the first core 110 can be curved.

In any case, the first core 110 can be configured so that it is suitable for high-power applications. For example, the first core 110 can be made of SiN (i.e., can be a SiN core). Such a SiN core can be a MOL SiN core. That is, during processing, it can be formed in the MOL some distance above the level of any front end of the line (FEOL) active or passive semiconductor devices and below the level of any back end of the line (BEOL) metal levels.

WG2 can have second end sections 121-122 and a second coupling section 123, which extends laterally between the second end sections 121-122 and which is further adjacent to the first coupling section 113. At least the second end section 122 can have an I/O port distal to the second coupling section 123. WG2 can be a stacked waveguide including multiple cores and, particularly, a second core 120 (also referred to herein as a primary core) and one or more additional second cores 125 (also referred to herein as secondary core(s)) stacked vertically and suitable cladding material, as discussed in greater detail below, surrounding and physically separating each of the cores.

The second core 120 can be positioned laterally adjacent to the first core 110. The second core 120 can have a strip/wire geometry, as illustrated. That is, the second core 120 can be an elongated body and a vertical cross-sectional shape of this elongated body cutting across its width can be essentially rectangular with a planar bottom surface, a planar top surface opposite the planar bottom surface, and opposing sidewalls. Alternatively, the second core 120 could have some other suitable geometry (e.g., a rib geometry (not shown), etc.). The height of the elongated body of the second core 120 can be essentially uniform from one end to the other. As illustrated, the width of the elongated body of the second core 120 could be tapered at least within the second coupling section 123 of WG2 from a maximum width adjacent to the second end section 122 to a minimum width adjacent to the opposite second end section 121. Alternatively, the width of the elongated body of the second core 120 can be essentially uniform (not shown). However, it should be understood that tapering of the second core 120 in the second coupling section 123 of WG2 (as shown) and/or tapering of the first core 110 in the first coupling section 113 increases the probability that mode matching will occur between the first and second coupling sections in order to achieve the desired splitting and/or combining function. Within the second coupling section 123, the second core 120 can be essentially linear. Within one or both of the second end sections 121-122, the second core 120 can be curved. It should be understood that adjacent ends of the first core 110 and the second core 120 should include at least one curved end in order to ensure a smooth transition for splitting and/or combining operations.

In any case, the second core 120, like the first core 110, can be configured so as to be suitable for high-power applications. For example, the second core 120 can also be made of SiN (i.e., can also be a MOL SiN core). However, the second core 120 can have one or more dimensions that are smaller than the corresponding dimensions of the first core 110. For example, the width of the second core 120 in the second coupling section 123 can be less than the width of the first core 110 in the adjacent first coupling section 113. In some embodiments, as illustrated, the width of the second core 120 in the second coupling section 123 can be tapered from a maximum width adjacent to the second end section 122 to a minimum width adjacent to the opposite second end section 121 and the first core 110 can have an essentially uniform width that is approximately equal to or greater than the maximum width of the second core 120. As illustrated, the first core 110 and the second core 120 can have equal heights (e.g., co-planar bottom and top surfaces). Additionally or alternatively, the first core 110 and the second core 120 could have different heights (e.g., co-planar bottom surfaces but non-co-planar top surfaces).

Figure 8A:
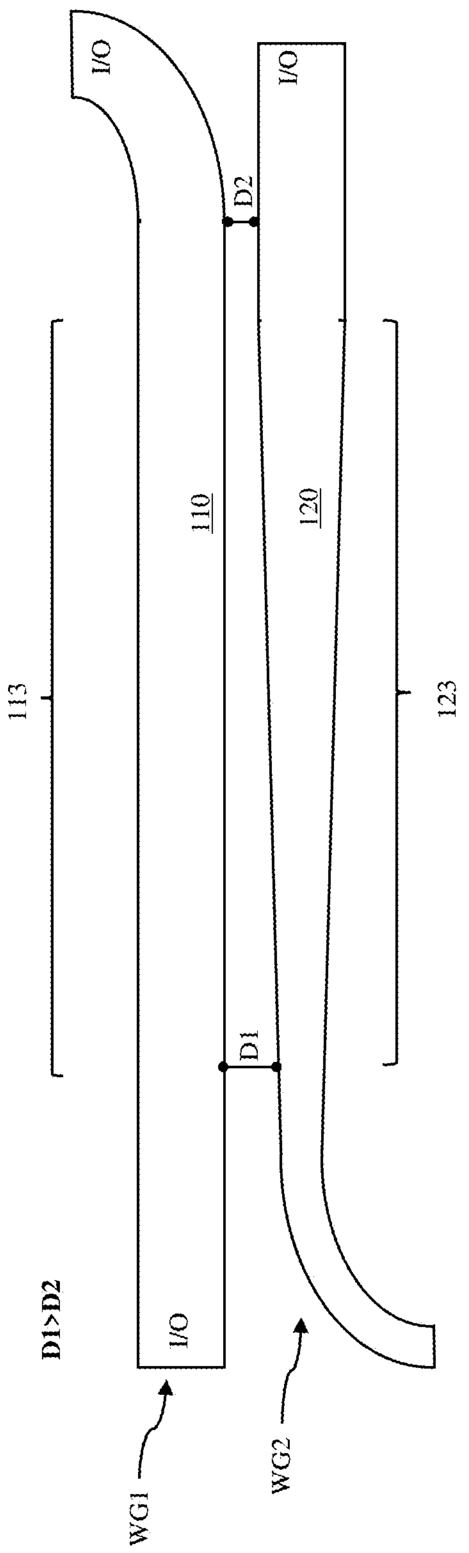
FIGS. 8A and 8B are different layout diagrams illustrating relative positions of the adjacent first and second sidewalls of the first and second cores in the first and second coupling sections of the first and second waveguides, respectively, in the polarization device in any of the disclosed PIC structure embodiments.
Figure 8B:
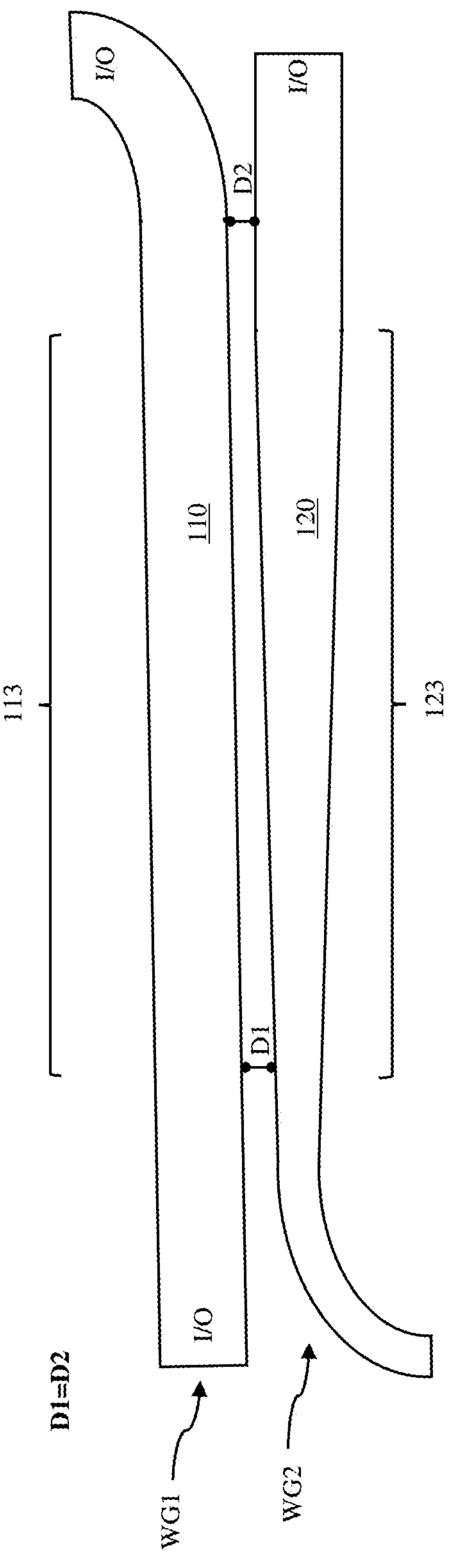

As mentioned above, in some embodiments, as the width of the second core 120 in the second coupling section 123 can be tapered from a maximum width adjacent to the second end section 122 to a minimum width adjacent to the opposite second end section 121 and the first core 110 can have an essentially uniform width that is approximately equal to or greater than the maximum width of the second core 120. As illustrated in FIGS. 1A, 2A, 3A, 4A, 5A, 7A and also in FIG. 8A, in this case, a first sidewall of the first core 110 in the first coupling section 113 can be angled relative to an adjacent second sidewall of the second core 120 in the second coupling section 123 such that a first distance (D1) between the first and second sidewalls as measured near the first end section 111 and second end section 121 is greater than a second distance (D2) between the first and second sidewalls as measured near the opposite first end section 112 and opposite second end section 122. Alternatively, as illustrated in FIG. 8B, instead of being angled relative to each other the adjacent first and second sidewalls of the first and second cores in any of the disclosed embodiments can be essentially parallel such that D1 is approximately equal to D2.

As mentioned above, the second core 120 is only one of multiple cores, which are stacked vertically, in WG2. Each additional second core can be essentially center-aligned with the second core 120 either above or below. The structure embodiments can vary with regard to the total number additional second cores, the material(s) for the additional second core(s), the cladding material surrounding the stacked cores, the dielectric materials between the stacked cores, and/or the size(s) of the additional second core(s).

For example, in some embodiments, WG2 can include the second core 120 and a single additional second core.

The single additional second core can be, for example, a monocrystalline semiconductor core 125.1 (e.g., see the polarization device 100.1 of FIGS. 1A-1D). The monocrystalline semiconductor core 125.1 can be, for example, a monocrystalline Si core. Such a monocrystalline Si core can, for example, be formed (e.g., lithographically patterned and etch) during processing from a front end of the line (FEOL) monocrystalline silicon layer on the insulator layer 104 (e.g., the same monocrystalline silicon layer used to form active semiconductor devices, etc.). Thus, the monocrystalline semiconductor core 125.1 can be above and immediately adjacent to the top surface of the insulator layer 104 and can further be covered by MOL dielectric material(s) 105. In any case, such a monocrystalline semiconductor core 125.1 can be essentially center-aligned with and below the second core 120. As illustrated, in the layout diagram of FIG. 1A, the top view shape of the monocrystalline semiconductor core 125.1 (including any tapering in the second coupling section 123) can be similar to that of the second core 120, but narrower in width across the full length. Alternatively, the monocrystalline semiconductor core 125.1 could be wider than the second core 120 across the full length.

Alternatively, the single additional second core can be a single polycrystalline semiconductor core 125.2 (e.g., see the polarization device 100.2 of FIGS. 2A-2D). The polycrystalline semiconductor core 125.2 can be, for example, a polycrystalline silicon (polySi) core. Such a polySi core can, for example, be formed (e.g., lithographically patterned and etched) during processing from the same polysilicon layer used to form polysilicon devices (e.g., resistors, etc.) or polysilicon device components (e.g., gate conductor layers for field effect transistors, etc.). The polycrystalline semiconductor core 125.2 can further be surrounded by MOL dielectric material(s) 105. The polycrystalline semiconductor core 125.2 can be above and separated some distance from the top surface of the insulator layer 104. The polycrystalline semiconductor core 125.2 can further be center-aligned with and below the second core 120. As illustrated, in the layout diagram of FIG. 2A, the top view shape of the polycrystalline semiconductor core 125.2 (including any tapering in the second coupling section 123) can be similar to that of the second core 120, but narrower in width across the full length. Alternatively, the polycrystalline semiconductor core 125.2 could be wider than the second core 120 across the full length.

Alternatively, the single additional second core can be another MOL dielectric core 125.3 (e.g., see the polarization device 100.3 of FIGS. 3A-3D). The MOL dielectric core 125.3 can be, for example, another MOL SiN core with the same refractive index as the second core 120 or, alternatively, with a different refractive index (e.g., a lower refractive index) than the second core 120. Those skilled in the art will recognize that the refractive indices of different layers of silicon and nitrogen-containing compounds can vary between, for example, approximately 1.5 and approximately 2.8 or even larger (e.g., up to 3.2) as a function of the processing techniques used. Alternatively, this MOL dielectric core 125.3 could be a core made of some other suitable relatively high refractive index material. Such high refractive index materials can include, but are not limited to, silicon carbon nitride (SiCN), silicon oxynitride (SiON), aluminum nitride (AlN), gallium nitride (GaN), alumina (Al2O3) or some other suitable high refractive index material. In any case, this MOL core 125.3 can further be surrounded by MOL dielectric material(s) 105. The MOL dielectric core 125.3 can be above, separated some distance from, and essentially center-aligned with the second core 120. As illustrated, in the layout diagram of FIG. 3A, the top view shape of the MOL dielectric core 125.3 (including any tapering in the second coupling section 123) can be similar to that of the second core 120, but narrower in width across the full length. Alternatively, the MOL dielectric core 125.3 could be wider than the second core 120 across the full length.

Alternatively, the single additional second core can be a BEOL core 125.4 (e.g., see the polarization device 100.4 of FIGS. 4A-4D). The BEOL core 125.4 can be, for example, a BEOL SiN core with the same refractive index as the second core 120 or, alternatively, with a different refractive index (e.g., a lower refractive index) than the second core 120. Alternatively, this BEOL core 125.4 could be a core made of some other suitable relatively high refractive index material. Such high refractive index materials can include, but are not limited to, silicon carbon nitride (SiCN), silicon oxynitride (SiON), aluminum nitride (AlN), gallium nitride (GaN), alumina (Al2O3) or some other suitable high refractive index material. In any case, this BEOL core 125.4 can further be surrounded by BEOL dielectric material 190. The BEOL core 125.4 can be above, separated some distance from, and essentially center-aligned with the second core 120. As illustrated, in the layout diagram of FIG. 4A, the top view shape of the MOL core 125.4 (including any tapering in the second coupling section 123) can be similar to that of the second core 120, but wider in width across the full length. Alternatively, the BEOL core 125.4 could be narrower than the second core 120 across the full length.

In other embodiments, WG2 can include multiple additional second cores including, but limited to, any combination of the additional second cores described above and illustrated in FIGS. 1A-1D to FIGS. 4A-4D. For example, WG2 could include a monocrystalline semiconductor core 125.1, as described above and illustrated in FIGS. 1A-1D, and also a polycrystalline semiconductor core 125.2, as described above and illustrated in FIGS. 2A-2D (e.g., see the polarization device 100.5 of FIGS. 5A-5D). Alternatively, WG2 could include the polycrystalline semiconductor core 125.2, as described above and illustrated in FIGS. 2A-2D, and also a MOL dielectric core 125.3, as described above and illustrated in FIGS. 3A-3D (e.g., see the polarization device 100.6 of FIGS. 6A-6D). Alternatively, WG2 could include a pair of BEOL cores 125.4*a*-125.4*b*, as described above and illustrated in FIGS. 4A-4D (e.g., see the polarization device 100.7 of FIGS. 7A-7D).

It should be understood that the figures are not intended to be limiting. For example, for purposes of illustration only two additional second cores are shown in FIGS. 5A-5D, 6A-6D and 7A-7D. However, alternatively, the disclosed structure embodiments could include a polarization device could include two or more additional second cores stacked above and/or below the second core. Thus, the disclosed structure embodiments could include a polarization device with any combination of the additional second cores described above (e.g., a monocrystalline semiconductor core 125.1, a polycrystalline semiconductor core 125.2, one or more MOL cores 125.3, and/or one or more BEOL cores 125.4).

It should be noted that, as illustrated in FIGS. 1A-7A and also in FIG. 9.1, the I/O ends of WG1 and WG2 can have an essentially uniform widths. Alternatively, as illustrated in FIGS. 9.2-9.5, any of the disclosed embodiments, at least one I/O end of the first core 110 and/or an I/O end of an additional second core 125 can be tapered to improve splitter and/or combiner performance.

As mentioned above, each of the cores within a polarization device (i.e., the first core 110 of WG1 and the second core 120 and additional second core(s) 125 of the WG2) will be surrounded by suitable cladding material. In order to facilitate and control optical signal propagation within and between these cores, the cladding material that is immediately adjacent to the core surfaces should have a smaller refractive index than the core material it clads. In each of the embodiments described above, the cladding material immediately adjacent to and surrounding the first core 110 and the second core 120 will be MOL dielectric material(s) 105. In embodiments where WG2 includes a monocrystalline Si core 125.1, the cladding material immediately adjacent to the bottom surface of the Si core 125.1 will be the dielectric material of the insulator layer 104 and the cladding material immediately adjacent to and surrounding the other surfaces will be MOL dielectric material(s) 105. In embodiments where WG2 includes a polySi core 125.2 and/or another MOL core 125.3, the cladding material immediately adjacent to and surrounding the polySi Core 125.2 will be MOL dielectric material(s) 105. In embodiments where WG2 includes a BEOL core 125.4, the cladding material immediately adjacent to and surrounding the BEOL Core 125.4 will be BEOL dielectric material(s) 190. Thus, it should be understood that the insulator layer 104, MOL dielectric material(s) 105, and BEOL dielectric material(s) 190 should be selected in order to achieve the required refractive index differential between cladding and core.

For example, SiN can have a refractive index of approximately 2.0, Si can have a refractive index that varies from approximately 3.3 to approximately 3.6 and silicon dioxide (SiO2) can have a refractive index of less 1.6. So, in some embodiments, where the first core 110 and the second core 120 are SiN and where the additional second core(s) are any of Si, polySi and SiN, the insulator layer 104, MOL dielectric material 105, and BEOL dielectric material 190 cladding these cores could be SiO2. It should be noted that, since SiN has a refractive index that is lower than the refractive index of Si, the MOL dielectric material covering a Si core 125.1 and/or a polySi core 125.2 could include a thin conformal SiN layer (e.g., an etch stop layer) immediately adjacent to the core and a SiO2 layer on the SiN layer.

The exemplary cladding materials mentioned above are offered for illustration purposes. It should be understood that, alternatively, any other suitable cladding material could be used, depending upon the core material. The following is a list of exemplary materials (including the refractive indices (n) thereof) that could potentially be incorporated into the disclosed semiconductor structure as cladding material, depending upon the selected core materials as long as the desired refractive index differential is achieved (i.e., as long as the cladding material has a smaller refractive index than the core material it clads):

(1) HfO2 (Hafnium dioxide), n=2.0754 @1.31 um, n=2.0709 @1.55 um;
(2) ZrO2 (Zirconium dioxide, Zirconia), n=2.1155 @1.31 um, n=2.1103 @1.55 um;
(3) Si3N4, n=~2;
(4) SiON, n=~1.46 to ~2.1;
(5) AlN (Aluminum nitride), n=~2.1 to ~2.4;
(6) TiO2 (Titanium dioxide), n=2.4622 @1.31 um, n=2.4538 @1.55 um;
(7) ZnO (Zinc monoxide), n=1.9318 @1.31 um, n=1.9267 @1.55 um;
(8) Al2O3 (Aluminum oxide), n=1.7503 @1.31 um, n=1.7462 @1.55 um;
(9) MgO (Magnesium oxide), n=1.7178 @1.31 um, n=1.7146 @1.55 um;
(10) SiO2 (Silicon dioxide), n<1.6, n=1.45 @1.31 um;
(11) CaF2 (Calcium fluoride), n=1.4272 @1.31 um, n=1.4260 @1.55 um;
(12) OMCTS (SiCOH) n=1.406 @1.31 um; and
(13) MgF2 (Magnesium fluoride), n=1.3718 @1.31 um, n=1.3705 @1.55 um.

In operation, the polarization device 100.1-100.7 can function as a splitter or a combiner.

For example, in the case of a polarization splitter, electric (TE)-mode light signals and transverse magnetic (TM)-mode light signals can be received at the I/O in the first end section 111 of WG1 and can propagate toward the I/O in the opposite first end section 112. However, prior to the light signals reaching the opposite first end section 112, some form of mode matching (e.g., TM-mode matching) as a function of the stacked design of WG2 can occur between the first coupling section 113 of WG1 and the second coupling section 123 of WG2. Those skilled in the art will recognize that this mode matching will occur between the adjacent coupling sections 113, 123 at location where the two sections have the same propagation constant. Thus, matched mode light signals pass from WG1 into WG2 and propagate toward the I/O in the second end section 122 of WG2 and the remaining mode light signals within WG1 continue to the I/O of the first end section 112 of WG1 (e.g., TE-mode light signals are output at I/O of the first end section 112 of WG1 and TM-mode light signals are output at I/O of the second end section 122 of WG2).

Also for example, in the case of a polarization combiner, light signals of one mode (e.g., TE-mode light signals) are received at the I/O of the first end section 112 of WG1 and propagate toward the I/O of the opposite first end section 111 of WG1. Additionally, light signals of the opposite mode (e.g., TM-mode light signals) are received at the I/O of the second end section 122 of WG2 and propagate toward the opposite second end section 121. However, prior to these light signals reaching the respective opposite end sections in the WG1 and WG2, some form of mode matching (e.g., TM-mode matching) occurs between the first coupling section 113 and the second coupling section 123 as a function of the stacked design of the WG2 such that matched mode light signals (TM-mode light signals) pass from WG2 into WG1 and also propagate toward the I/O end of the first end section 111 of WG1. Thus, light signals of both modes (i.e., TE-mode light signals and TM-mode light signals) are output from the I/O of the first end section 111 of WG1.

Such polarization devices 100.1-100.7 (i.e., polarization splitters and/or polarization combiners) are easily integrated with high-power photonic device processing and are more robust and exhibit improved performance in high-power applications as compared to prior art Si-based polarization devices.

It should be understood that in the embodiments described above, a semiconductor material refers to a material whose conducting properties can be altered by doping with an impurity. Exemplary semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region.

It should further be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:

a substrate; and a polarization device on the substrate and including:

a first waveguide with first end sections and a first coupling section between the first end sections, wherein the first waveguide comprises a single first core; and a second waveguide having second end sections and a second coupling section between the second end sections, wherein the second coupling section is positioned laterally adjacent to the first coupling section, and wherein the second waveguide comprises:

a second core positioned laterally adjacent to the first core; and multiple additional second cores stacked vertically with each other and with the second core, and physically separated from each other and from the second core, wherein the multiple additional second cores facilitate mode matching of light signals between the first coupling section and the second coupling section, and wherein the multiple additional second cores are stacked below and center-aligned with the second core.

2. The structure of claim 1, wherein the first core and the second core are silicon nitride cores.

3. The structure of claim 1, wherein the polarization device is a polarization splitter, and wherein, due to the multiple additional second cores stacked vertically with the second core within the polarization splitter, when transverse electric mode light signals and transverse magnetic mode light signals are both received through an input/output port at one of the first end sections of the first waveguide, matched mode light signals pass from the first coupling section to the second coupling section and only one of the transverse electric mode light signals and the transverse magnetic mode light signals are output from an input/output port at another one of the first end sections of the first waveguide.

4. The structure of claim 1, wherein a second core material of the second core is different from additional second core materials of the multiple additional second cores.

5. The structure of claim 1, wherein the multiple additional second cores are semiconductor cores.

6. The structure of claim 1, wherein the polarization device is a polarization combiner, and wherein, due to the multiple additional second cores stacked vertically with the second core within the polarization combiner, when one of transverse electric mode light signals and transverse magnetic mode light signals are received through an input/output port at one of the first end sections of the first waveguide and a different one of the transverse electric mode light signals and the transverse magnetic mode light signals are received through an input/output port at a second end section of the second waveguide, matched mode light signals pass from the second coupling section to the first coupling section and both the transverse electric mode light signals and the transverse magnetic mode light signals are output from an input/output port at another one of the first end sections of the first waveguide.

7. The structure of claim 1, wherein the first waveguide has a uniform first width in the first coupling section, wherein the second coupling section has a tapering second width between a wide second end section to a narrow second end section, and wherein the multiple additional second cores are narrower in width than the second core.

8. The structure of claim 1, wherein the multiple additional second cores are shorter in height than the second core.

9. A structure comprising:

a substrate; and a polarization device on the substrate and including:

a first waveguide with first end sections and a first coupling section between the first end sections, wherein the first waveguide comprises a single first core; and a second waveguide having second end sections and a second coupling section between the second end sections, wherein the second coupling section is positioned laterally adjacent to the first coupling section, and wherein the second waveguide comprises:

a second core positioned laterally adjacent to the single first core; and multiple additional second cores, wherein the second core is stacked vertically between and center-aligned with two of the multiple additional second cores, wherein the multiple additional second cores include a semiconductor material core below the second core and a dielectric material core above the second core, and wherein the multiple additional second cores facilitate mode matching of light signals between the first coupling section and the second coupling section.

10. The structure of claim 9, wherein the first core and the second core are silicon nitride cores.

11. The structure of claim 9, wherein a second core material of the second core is different from additional second core materials of the multiple additional second cores.

12. The structure of claim 9, wherein the semiconductor material core includes a polysilicon core.

13. The structure of claim 9, wherein the dielectric material core includes any of silicon nitride, silicon carbon nitride, silicon oxynitride, aluminum nitride, gallium nitride, and alumina.

14. The structure of claim 9, wherein the multiple additional second cores are narrower in width than and center-aligned with the second core.

15. A structure comprising:

a substrate; and a polarization device on the substrate and including:

a first waveguide with first end sections and a first coupling section between the first end sections, wherein the first waveguide comprises a single first core; and a second waveguide having second end sections and a second coupling section between the second end sections, wherein the second coupling section is positioned laterally adjacent to the first coupling section, and wherein the second waveguide comprises:

a second core positioned laterally adjacent to the single first core; and multiple additional second cores stacked vertically with each other and further stacked vertically above and center-aligned with the second core, wherein the multiple additional second cores facilitate mode matching of light signals between the first coupling section and the second coupling section.

16. The structure of claim 15, wherein the first core and the second core are silicon nitride cores and wherein the multiple additional second cores include any of silicon nitride, silicon carbon nitride, silicon oxynitride, aluminum nitride, gallium nitride, and alumina.

17. The structure of claim 15, wherein the multiple additional second cores have approximately equal widths.

18. The structure of claim 15, wherein the multiple additional second cores are wider than the second core without extending laterally over the first core.

* * * * *